(12) United States Patent
Berryhill et al.

(10) Patent No.: US 7,677,032 B2
(45) Date of Patent: *Mar. 16, 2010

(54) APPARATUS, SYSTEM, AND METHOD FOR DETERMINING THE DISTRIBUTION OF PARTICULATE MATTER ON A PARTICULATE FILTER

(75) Inventors: Ross C. Berryhill, Nashville, IN (US); Neal W. Currier, Columbus, IN (US); J. Steve Wills, Columbus, IN (US); Joan Wills, Nashville, IN (US); Aleksey Yezerets, Columbus, IN (US)

(73) Assignee: Cummins, Inc., Minneapolis, MN (US)

( * ) Notice: Subject to any disclaimer, the term of this patent is extended or adjusted under 35 U.S.C. 154(b) by 53 days.

This patent is subject to a terminal disclaimer.

(21) Appl. No.: 11/226,972

(22) Filed: Sep. 15, 2005

(65) Prior Publication Data
US 2007/0056271 A1 Mar. 15, 2007

(51) Int. Cl.
*F01N 3/00* (2006.01)
(52) U.S. Cl. .............. 60/297; 60/274; 60/277; 60/285; 60/286; 60/287; 60/295; 60/311
(58) Field of Classification Search ............ 60/274, 60/278, 280, 285, 286, 287, 288, 291, 295, 60/297, 301, 303, 311
See application file for complete search history.

(56) References Cited
U.S. PATENT DOCUMENTS

| 6,405,528 B1 * | 6/2002 | Christen et al. ............... 60/295 |
| 6,622,480 B2 | 9/2003 | Tashrio et al. ................. 60/295 |
| 6,756,904 B2 | 6/2004 | Kinugawa et al. ........... 340/606 |
| 6,758,039 B2 | 7/2004 | Kuboshima et al. ........... 60/311 |
| 6,829,889 B2 | 12/2004 | Saito et al. ..................... 60/291 |
| 6,829,890 B2 * | 12/2004 | Gui et al. ....................... 60/295 |
| 6,851,258 B2 * | 2/2005 | Kawashima et al. ........... 60/311 |
| 6,854,265 B2 | 2/2005 | Saito et al. ..................... 60/295 |
| 6,907,873 B2 | 6/2005 | Hamahata .................... 123/676 |
| 6,941,750 B2 * | 9/2005 | Boretto et al. ................. 60/297 |
| 6,983,591 B2 * | 1/2006 | Kondo et al. .................. 60/295 |
| 7,107,760 B2 * | 9/2006 | Shirakawa .................... 60/285 |
| 7,137,247 B2 * | 11/2006 | Koga et al. .................... 60/295 |
| 7,169,364 B2 * | 1/2007 | Ohtake et al. ................ 422/168 |
| 7,231,291 B2 * | 6/2007 | Dollmeyer et al. .......... 701/114 |
| 2002/0196153 A1 | 12/2002 | Kinugawa et al. ........... 340/606 |
| 2003/0167757 A1 | 9/2003 | Boretto et al. ................. 60/295 |
| 2004/0172933 A1 | 9/2004 | Saito et al. ..................... 60/277 |
| 2004/0204818 A1 | 10/2004 | Trudell et al. ................ 701/114 |

* cited by examiner

*Primary Examiner*—Binh Q. Tran
(74) *Attorney, Agent, or Firm*—Kunzler Needham Massey & Thorpe

(57) ABSTRACT

An apparatus, system, and method are disclosed for determining the distribution of particulate matter on a particulate filter. The apparatus, in one embodiment, determines a first distribution of particulate matter by comparing the pressure change across the particulate filter with a change in engine operating conditions. The apparatus may include an input module for receiving input corresponding to engine operating conditions and input from a differential pressure sensor and a feedback module to determine a first distribution of particulate matter. The apparatus may further include a feed forward module for determining a particulate distribution trend and a selection control module to combine the first distribution of particulate matter with the particulate distribution trend to determine a second distribution of particulate matter. The distribution may be defined as a uniform distribution factor in certain embodiments.

28 Claims, 13 Drawing Sheets

APPARATUS, SYSTEM, AND METHOD FOR DETERMINING THE DISTRIBUTION OF PARTICULATE MATTER ON A PARTICULATE FILTER

BACKGROUND OF THE INVENTION

1. Field of the Invention

This invention relates to exhaust gas after-treatment systems, and more particularly to apparatuses, systems and methods for determining the distribution of particulate matter on a particulate filter.

2. Description of the Related Art

Environmental concerns have motivated the implementation of emission requirements for internal combustion engines throughout much of the world. Governmental agencies, such as the Environmental Protection Agency in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter, nitrogen oxides, and unburned hydrocarbons. Catalytic converters implemented in an exhaust gas after-treatment system have been used to eliminate many of the pollutants present in exhaust gas; however, to remove diesel particulate matter, typically a diesel particulate filter must be installed downstream from a catalytic converter, or in conjunction with a catalytic converter.

A common diesel particulate filter comprises a porous ceramic matrix with parallel passageways through which exhaust gas passes. Particulate matter subsequently accumulates on the surface of the filter, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, including, but not limited to, engine operating conditions, mileage, driving style, and terrain affect the rate at which particulate matter accumulates within a diesel particulate filter.

Accumulation of particulate matter typically causes backpressure within the exhaust system which can degrade engine performance. Particulate matter, in general, oxidizes in the presence of $NO_2$ at modest temperatures, or in the presence of oxygen at higher temperatures. If too much particulate matter has accumulated when oxidation begins, the oxidation rate may reach a point that it causes an uncontrolled temperature excursion. The resulting heat can destroy the filter and damage surrounding structures. Recovery can be an expensive process.

To prevent potentially hazardous situations, it is desirable to oxidize accumulated particulate matter in a controlled regeneration process before it builds to excessive levels. To oxidize the accumulated particulate matter, temperatures generally must exceed the temperatures typically reached at the filter inlet. Oxidation temperatures will be achieved under normal operating conditions in some applications, although in others, additional methods to initiate regeneration of a diesel particulate filter must be used. In one method, a reactant, such as diesel fuel, is introduced into an exhaust after-treatment system to generate temperature and initiate oxidation of particulate buildup in the filter. Partial or complete regeneration may occur depending on the duration of time the filter is exposed to elevated temperatures and the amount of particulate matter remaining on the filter. Partial regeneration, caused either by controlled regeneration or uncontrolled regeneration, can contribute to irregular distribution of particulate matter across the substrate of a particulate filter. Irregular or non-uniform distribution contributes to errors in estimating the amount of particulate on the filter, among other problems.

Controlled regeneration traditionally has been initiated at set intervals, such as distance traveled or time passed. Interval-based regeneration, however, has not proven to be totally effective for several reasons. First, regenerating a particulate filter with little or no particulate buildup lessens the fuel economy of the engine and unnecessarily exposes the particulate filter to destructive temperature cycles. Second, if particulate matter accumulates significantly before the next regeneration, backpressure from blockage of the exhaust flow can negatively affect engine performance. In addition, regeneration (intentional or unintentional) of a particulate filter containing large quantities of particulate buildup can become uncontrolled and potentially cause filter failure or the like. Consequently, many particulate filters regenerated on a set interval must be replaced frequently to maintain the integrity of the exhaust gas after-treatment system.

Recently, attempts have been made to estimate the amount of particulate matter accumulated in a particulate filter in order to respond more efficiently to actual particulate buildup, such as, in one widely used method, through differential pressure across a diesel particulate filter. These attempts, however, often do not account for variations in engine operating conditions, sensor noise levels, exhaust flow estimate errors, and unevenly distributed particulate accumulation. In many cases they also integrate errors over time and deviate from real soot loading conditions.

From the foregoing discussion, it should be apparent that a need exists for an apparatus, system, and method that determine a distribution of particulate matter on a particulate filter and overcome the shortcoming of the present systems.

SUMMARY OF THE INVENTION

The present invention has been developed in response to the present state of the art, and in particular, in response to the problems and needs in the art that have not yet been fully solved by currently available exhaust gas after-treatment systems. Accordingly, the present invention has been developed to provide an apparatus, system, and method for determining the distribution of particulate matter on a particulate filter.

In one embodiment, the apparatus according to the invention, determines a first distribution of particulate matter by comparing the pressure change across the particulate filter with a change in engine operating conditions. The apparatus may include an input module for receiving input corresponding to engine operating conditions and input from a differential pressure sensor, and a feedback module to determine a first distribution of particulate matter. In one embodiment, engine operating conditions include time and/or exhaust gas flow. The apparatus may further include a feed forward module for determining a particulate distribution trend and a selection control module to combine the first distribution of particulate matter with the particulate distribution trend to determine a second distribution of particulate matter.

The apparatus, in certain embodiments, may further include a transient exhaust gas flow rate module for tracking changes in apparent differential pressure-based particulate loading during transient exhaust gas flow rates. In addition, a transient apparent particulate loading module may track changes in apparent differential pressure-based particulate loading.

In one embodiment, the feedback module further defines the distribution of particulate matter as a uniform distribution factor, which may subsequently be used to facilitate determining an accurate estimate of particulate matter accumulated on the particulate filter. In one embodiment, the selection control module determines a uniform distribution factor adjustment according to the particulate distribution trend. One or more models may be used, in certain embodiments, to provide supplemental data to determine the particulate distribution trend. In one embodiment, the model defines a physical condition such as a soot accumulation rate. The soot accumulation rate may facilitate determining when the distribution of particulate matter is changing on the filter and may be indicative of a filter regeneration event under certain conditions. Supplemental data relative to a detected regeneration event may be used to determine a particulate distribution trend.

A system of the present invention is also presented to treat exhaust gas emitted as a byproduct of operation of an internal combustion engine. The system may determine the distribution of particulate matter on a particulate filter and may be embodied in an exhaust gas after-treatment system. In particular, the system, in one embodiment, includes an internal combustion engine, sensors for determining engine operating conditions, a differential pressure sensor for determining the pressure change across the filter, and a controller for selectively combining the pressure change with a change in the engine operating conditions to determine a first distribution of particulate matter on the filter.

In a further embodiment, the controller selectively combines the first particulate distribution with a particulate distribution trend derived from known operating conditions to determine a second particulate distribution. The determined particulate distribution may facilitate determining when a delta pressure particulate or soot loading estimate is reliable and may consequently facilitate determining an accurate soot loading estimate on a particulate filter.

A method of the present invention is also presented for determining the distribution of particulate matter on a filter. The method may include determining engine operating conditions, determining the pressure change of exhaust gas upstream and downstream from the filter, and comparing the pressure change with a change in the engine operating conditions to determine a first distribution of particulate matter on the filter. The method may further include determining a particulate distribution trend and selectively combining the particulate distribution trend and first distribution of particulate matter to determine a second distribution of particulate matter on the filter.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention enables determining the distribution of particulate matter on a particulate filter from feedback and from a selected combination of feedback and supplemental data. The distribution may be used to selectively utilize a differential pressure sensor to get a more accurate determination of soot loading on a particulate filter. Consequently, the exhaust gas after-treatment system may determine the actual condition of the particulate filter and may determine when to initiate filter regenerations more efficiently. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
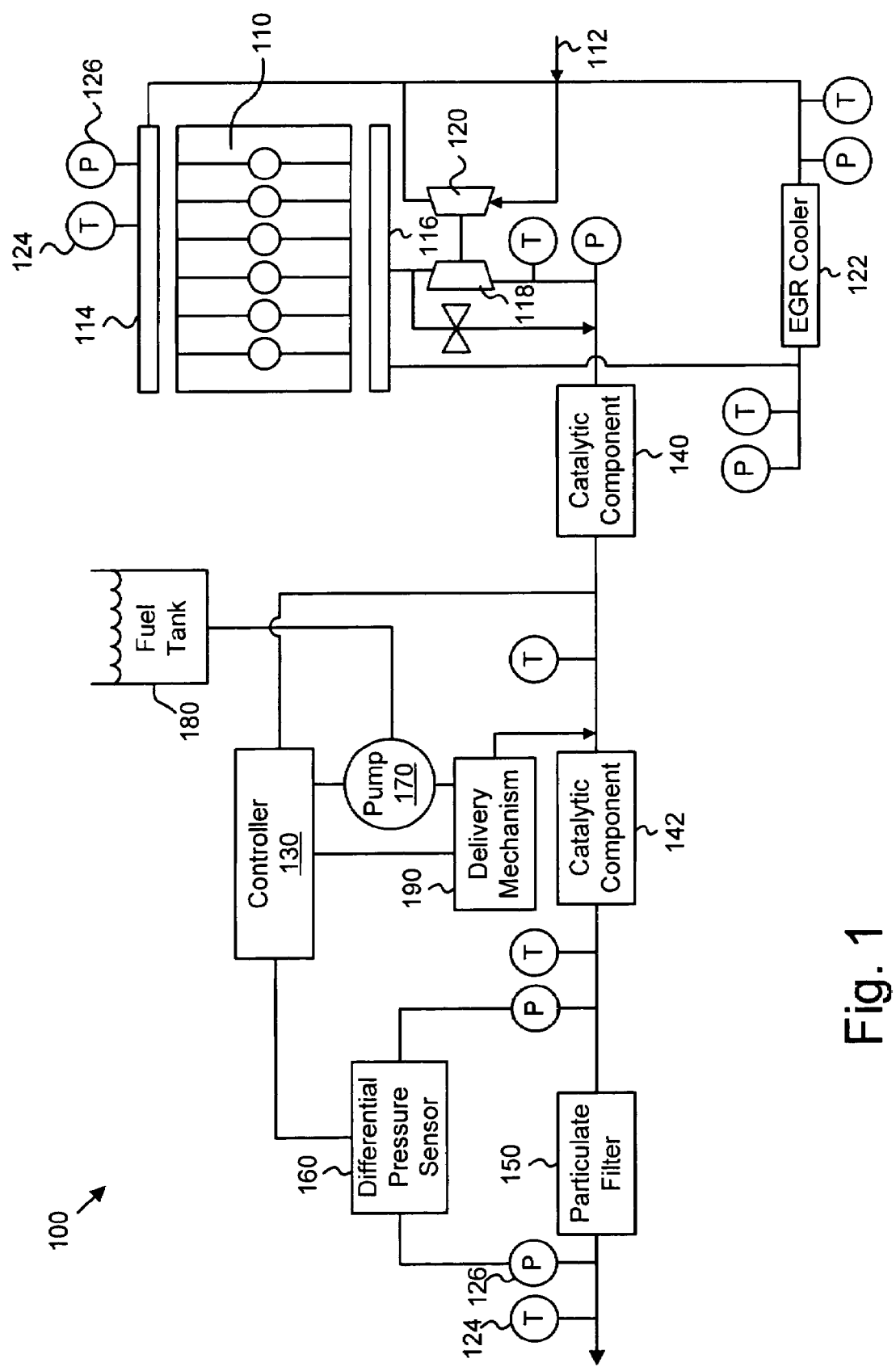
FIG. 1 is a schematic block diagram illustrating one embodiment of an engine and exhaust gas after-treatment system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an exhaust gas after-treatment system 100 in accordance with the present invention. The exhaust gas after-treatment system 100 may be implemented in conjunction with an internal combustion engine 110 to remove various chemical compounds and particulates from emitted exhaust gas. As illustrated, the exhaust gas after-treatment system 100 may include the internal combustion engine 110, a controller 130, one or more catalytic components 140 and 142, a particulate filter 150, a differential pressure sensor 160, a reactant pump 170, a fuel tank 180, and a reactant delivery mechanism 190. Exhaust gas treated in the exhaust gas after-treatment system 100 and released into the atmosphere consequently contains significantly fewer pollutants, such as diesel particulate matter, nitrogen oxides, hydrocarbons, and carbon monoxide, than untreated exhaust gas.

The exhaust gas after-treatment system 100 may further include an air inlet 112, an intake manifold 114, an exhaust manifold 116, a turbocharger turbine 118, a turbocharger compressor 120, an exhaust gas recirculation (EGR) cooler 122, temperature sensors 124, and pressure sensors 126. In one embodiment, the air inlet 112 is vented to the atmosphere, enabling air to enter the exhaust gas after-treatment system 100. The air inlet 112 may be connected to an inlet of the intake manifold 114. The intake manifold 114 includes an outlet operatively coupled to the compression chamber of the internal combustion engine 110. Within the internal combustion engine 110, compressed air from the atmosphere is combined with fuel and the mixture is ignited to power the engine 110. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 may pass through the catalytic components 140, 142 and/or particulate filter 150 in order to reduce the number of pollutants contained in the exhaust gas before venting the exhaust gas into the atmosphere. Another portion of the exhaust gas may be re-circulated to the engine 110. In certain embodiments, the engine gas recirculation cooler 122, which is operatively connected to the inlet of the intake manifold 114, cools exhaust gas in order to facilitate increased engine air compression. In certain embodiments, a portion of the exhaust gas may be diverted through a system valve to an exhaust bypass (not shown). The exhaust gas bypass may have an outlet operatively linked to the inlet of the particulate filter 150, which may comprise a catalytic soot filter in certain embodiments.

Exhaust gas may pass through the catalytic component 140, comprising a hydrocarbon oxidation catalyst or the like, in certain embodiments. Various sensors, such as temperature sensors 124, pressure sensors 126, and the like, may be strategically disposed throughout the exhaust gas after-treatment system 100 and may be in communication with the controller 130 to monitor operating conditions.

The exhaust gas after-treatment system 100 may direct the exhaust gas to the inlet of another catalytic component 140, comprising a $NO_x$ adsorption catalyst or the like. Alternatively or in addition, the particulate filter 150 may comprise a catalytic soot filter in certain embodiments. Particulate matter in the exhaust gas, such as soot and ash, may be retained within the particulate filter 150. The exhaust gas may subsequently be vented to the atmosphere.

In addition to filtering the exhaust gas, the exhaust gas after-treatment system 100 may include a system for introducing a reactant, such as fuel, into the exhaust gas or into components of the exhaust gas after-treatment system 100. The reactant may facilitate oxidation of various chemical compounds adsorbed within the catalytic component 142 and may also facilitate regeneration of the particulate filter 150. The fuel tank 180, in one embodiment, may be connected to the reactant pump 170. The pump 170, under direction of the controller 130, may provide fuel or the like to the reactant delivery mechanism 190, such as a nozzle, which may be operatively coupled to the inlet of the catalytic component 142 and/or the particulate filter 150. The reactant pump 170, the reactant delivery mechanism 190, and an exhaust valve, in certain embodiments, may be directed by the controller 130 to create an environment conducive to oxidation of chemical compounds.

A method of regenerating at least one component of the exhaust gas after-treatment system 100, according to one embodiment, comprises periodically reducing the flow of exhaust gas to the catalytic component 142 undergoing regeneration and introducing reactant into the catalytic component 142. During the same duty cycle, the controller 130 directs the reactant pump 170 to deliver reactant to the reactant delivery mechanism 190. The controller 130 subsequently regulates the delivery mechanism 190 to deliver selected amounts of reactant into the catalytic component 142. During the same duty cycle after each injection of reactant, the delivery mechanism 190 may be closed and no additional reactant delivered directly to the catalytic component 142. The effect of this sequence produces a series of injections of reactant into the inlet of the catalytic component 142 during a given duty cycle. As a result, the controller 130 may control the rate of regeneration of the catalytic component 142 and/or the particulate filter 150.

In certain embodiments, the exhaust gas after-treatment system 100 may be configured to determine an appropriate time to introduce reactant into the system 100. Appropriate timing of regeneration may contribute to an increase in the fuel economy of a vehicle, extended life expectancy of a particulate filter, and increased overall efficiency of an engine 110.

Figure 2:
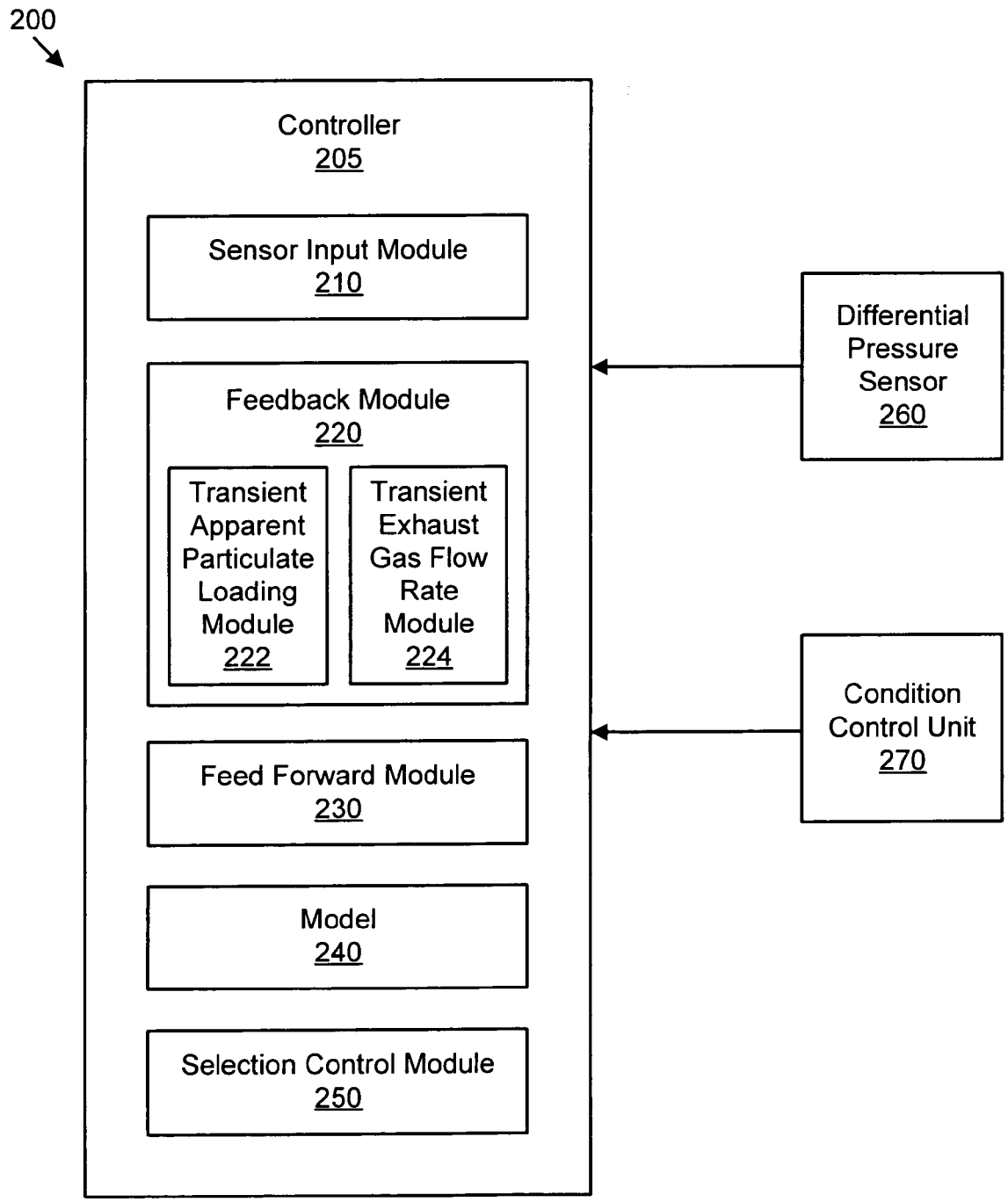
FIG. 2 is a schematic block diagram illustrating one embodiment of a control system in accordance with the present invention.

FIG. 2 illustrates one embodiment of a control system 200 in accordance with the present invention. The control system as depicted includes a controller 205, a sensor input module 210, a feedback module 220, a feed forward module 230, a model 240, and a selection control module 250. In addition, the controller 205 receives input from a differential pressure sensor 260 and a condition control unit 270. The controller 205 etc. determines a distribution of particulate matter on a particulate filter by selectively combining input from the differential pressure sensor 260 and from the condition control unit 270. In certain embodiments, determining the distribution of particulate matter on a particulate filter aids in more accurately determining the actual amount of particulate matter accumulated on a particulate filter. Thus, regeneration of a particulate filter may be performed when determined necessary. A history of filter regeneration events may also facilitate determining the condition of a particulate filter and the distribution of the particulate matter.

The input module 210 receives input from the differential pressure sensor 260, which determines the differential pressure of exhaust gas upstream and downstream from the particulate filter. Under certain conditions, an estimate of the particulate matter, soot and/or ash, accumulated on the particulate filter may be accurately determined from the differential or delta pressure measurement. The input module 210, in certain embodiments, calculates data relative to information received from the differential or delta pressure sensor 260 and determines a particulate load estimate.

The pressure change information alone, however, typically does not indicate or accurately describe how accumulated particulate matter on the particulate filter is distributed. Delta-pressure derived estimates of accumulated particulate matter may be inaccurate due to undetected, non-uniform distribution of particulate matter.

Oxidation of accumulated soot often creates cleared passageways or holes between clusters of accumulated particulate matter. As a result, exhaust gas may pass freely through the small passageways or holes, thereby causing the delta-pressure sensor 260 to estimate an amount of particulate matter buildup lower than the actual accumulated amount. In addition, a delta-pressure derived particulate matter estimate is typically less reliable under certain operating conditions such as low exhaust gas flow rate, variable engine speeds, etc. Delta-pressure sensor estimates generally become more reliable over time as the holes begin to fill and the distribution of particulate matter becomes more uniform.

Further input is often needed to determine when a delta-pressure sensor estimate is reliable and whether the distribution of particulate matter negatively affects the estimated value. The input module 210 may further receive input corresponding to engine operating conditions. Feedback from engine operating conditions and other information from an exhaust gas after-treatment system 100 may facilitate determining a distribution of particulate matter on a particulate filter. Since no direct sensor is currently available to measure the soot load or the distribution of particulate matter on the filter, a number of "virtual sensors" may facilitate estimating an actual condition. An apparatus, system and method for providing combined sensor and estimated feedback by determining a predicted reliability of a sensor response and/or an estimation are disclosed in related application entitled, "APPARATUS, SYSTEM, AND METHOD FOR PROVIDING COMBINED SENSOR AND ESTIMATED FEEDBACK," which is hereby incorporated by reference into this document.

In one embodiment, the feedback module 220 determines a first distribution of particulate matter on the particulate filter 150. The feedback module 220 may receive information from the condition control unit 270 and/or input module 210. The information may include input corresponding to engine operating conditions as well as information relative to the overall exhaust gas after-treatment system 100. In certain embodiments, feedback and/or engine operating conditions may include, but is not limited to, time, a temperature-compensated flow rate, engine output, fueling rate, fuel timing, sensor information, related calculations, and other data.

The feedback module 220, in certain embodiments, includes a transient apparent soot loading (TSL) module 222 and a transient exhaust gas flow rate (TFR) module 224. The TSL module 222 and the TFR module 224 facilitate determining a first distribution of particulate matter on the particulate filter 150. The feedback module 220 compares the change in pressure across the particulate filter 260 with a change in engine operating conditions. In certain embodiments, time is a function of the engine operating conditions. The TSL module 222 tracks changes in apparent differential pressure-based soot loading. In certain embodiments, the TSL module 222 may track changes over a given period of time.

Multiple particulate mass estimates determined over time may indicate a rate of particulate matter accumulation on the particulate filter 150, which may facilitate estimating particulate matter distribution. Experimental observation suggests that if particulate matter on a particulate filter 150 is unevenly distributed, then subsequent differential pressure-based soot load estimates generally indicate an accumulation rate much higher than typical or possible for a uniformly-distributed particulate filter 150. The accumulation rate for a mal-distributed filter 150 is generally higher because of the particulate matter already present on the filter 150: the accumulating particulate matter tends to fill in the holes between particulate clusters more rapidly than for an evenly-distributed surface because exhaust gas passes more readily through the open holes. Once the holes are filled with accumulated particulate matter, particulate on the filter 150 becomes more uniformly distributed and subsequent delta-pressure mass estimates reflect a more typical accumulation rate.

In one embodiment, the feedback module 220 compares the apparent accumulation rate to a fixed rate that is higher than the true particulates the system 100 is capable of producing in normal operating conditions. In another embodiment, the feedback module 220 screens delta-pressure estimates through a verification process to determine a plausible accumulation rate. Furthermore, the feedback module 220 may determine the particulate distribution by comparing delta-pressure based particulate estimates at different flow rates over a short period of time. Each of these mechanisms will be described in further detail below.

Figure 3A:
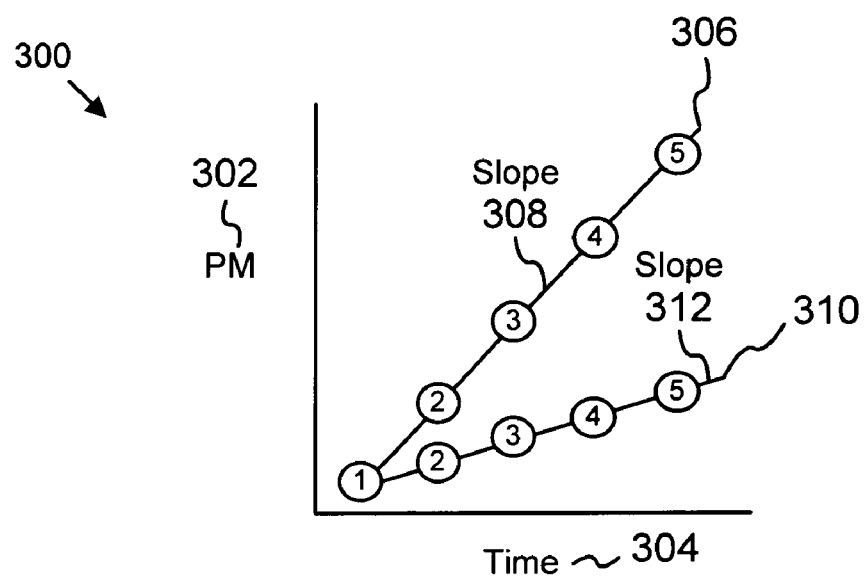
FIG. 3A is a graph comparing one embodiment of a soot accumulation rate determined by delta pressure soot loading estimates with one embodiment of a soot accumulation rate determined by a model estimation under similar conditions.

FIG. 3A is a graph 300 illustrating one embodiment of multiple particulate mass 302 estimates in grams/liter determined over time 304 during engine operation. To determine the distribution of particulate matter, according to one embodiment, the TSL module 222 may compare the rate of particulate accumulation determined from multiple delta-pressure mass estimates 306 (1-5) taken over time 304, i.e. slope 308, with an accumulation rate derived from a plurality of model 240—based mass estimates 310 (1-5) calculated for similar engine operating conditions over time 304, i.e. a slope 312.

One method of determining a model-based accumulation rate is governed by the equation:

$$m_{filtersoot} = m_{generatedsoot} - m_{NO_2 Oxidation} - M_{O_2 Oxidation} \quad \text{Equation 1}$$

where $m_{filtersoot}$=the rate of particulate or soot accumulation;

$m_{generatedsoot}$=the rate of particulate or soot generation;
$m_{NO2}$=the rate of soot oxidation from $NO_2$; and
$m_{O2}$=the rate of soot oxidation from $O_2$.

A method for determining an oxidation rate from a model 240 is disclosed in related application Ser. No. 11/227,403 entitled "APPARATUS, SYSTEM, AND METHOD FOR ESTIMATING PARTICULATE CONSUMPTION," which is hereby incorporated by reference into this document. A method for estimating particulate output from an engine is disclosed in related application Ser. No. 12/265,500 entitled "APPARATUS, SYSTEM, AND METHOD FOR ESTIMATING PARTICULATE PRODUCTION," which is hereby incorporated by reference into this document.

Slope 312 may indicate a maximum possible particulate matter accumulation rate, in certain embodiments, for the time 304 and conditions indicated. Accordingly, an accumulation rate indicated by the slope 308 that is greater than a maximum accumulation rate indicated by the slope 312 may indicate mal-distribution. Alternatively, a maximum value, such as a maximum particulate matter engine output based on empirical evidence relating to the specific engine platform, such as an 11-liter or 15-liter diesel engine, may be established to indicate mal-distribution. If the delta pressure measurement from the sensor 260 indicates a soot load or soot load accumulation rate above the maximum possible value, then mal-distribution may be indicated.

A degree of mal-distribution may be determined to describe the distribution of particulate matter on a particulate filter 150. In one embodiment, a first distribution of particulate matter may be determined by the equation:

$$\Delta m_{by\Delta P} / \Delta m_{byMB} = \text{distribution indicator} \quad \text{Equation 2}$$

where $\Delta m_{by\Delta P}$=the rate of accumulation as determined by a differential pressure sensor;
and $\Delta m_{byMB}$=the rate of accumulation as determined from a model for the same period of time.

The greater the difference between slope 308 and slope 312, in one embodiment, the greater the mal-distribution of accumulated particulate matter. This comparison method to determine particulate mal-distribution may require a sufficient amount of time 304 for particulate matter to accumulate such that an accumulation rate may be determined or a meaningful comparison may be made. In certain embodiments, the time 304 required may be at least fifteen minutes.

In one embodiment, the TSL module 222 tracks the average rate of soot accumulation apparent to the differential pressure estimate over a period of time. The feedback module 220 may screen some differential pressure estimate indications to ensure that only highly reliable estimates go into the algorithm. Deviation from the average rate may indicate mal-distribution.

Figure 3B:
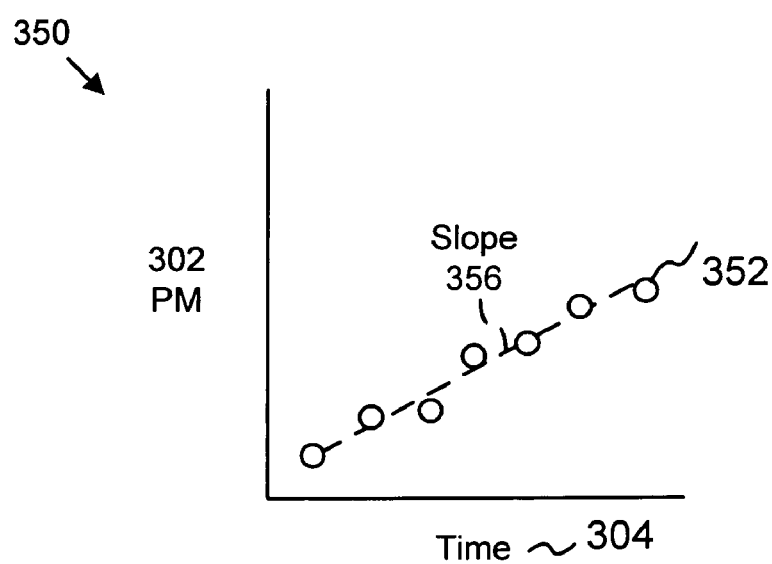
FIG. 3B is a graph illustrating one embodiment of a soot accumulation rate determined by delta pressure measurements in accordance with the present invention.

FIG. 3B is a graph 350 illustrating a series of screened delta or differential pressure-based particulate loading estimates 352 charted over time 304. In the depicted embodiment, only values passing a verification process, such as comparisons with model 240-based estimates, are used to evaluate the actual particulate accumulation, thereby eliminating values that do not plausibly reflect actual particulate loading. As a result, a reliable average accumulation rate, or slope 356, may be determined.

In one embodiment, a verification process may comprise verifying that the delta pressure measurement was taken while the exhaust flow rate was relatively high, because higher flow rates tend to yield more accurate delta-pressure soot load estimates. A further check may verify that the ratio of the change in exhaust flow rate and the change in time is greater than a certain value n, as defined by the equation:

$$\Delta flow / \Delta t > n \quad \text{Equation 3}$$

where $\Delta flow$=the difference in exhaust gas flow rates at the time the delta-pressure-based measurements are taken;
$\Delta t$=the period of time between delta-pressure measurements; and
n=a minimal value determined for comparison.

Value verification checks facilitate identifying delta pressure-based particulate mass values that could logically represent the actual particulate mass accumulated. Consequently, accurate accumulation trends may be identified and the soot load may be accurately estimated.

In addition, time may function as a verification check to determine the reliability of a delta pressure mass estimate. Consistent delta-pressure mass estimates taken over time indicate reliability. Irregularities may indicate filter mal-distribution. If the filter 150 does not undergo a filter regeneration event, mal-distributed particulate matter tends to become more uniformly distributed over time as openings in the trapped particulate matter begin to fill. Consequently, delta-pressure measurements tend to become more indicative of an actual amount of soot accumulation over time as particulate distribution becomes more uniform.

Figure 4A:
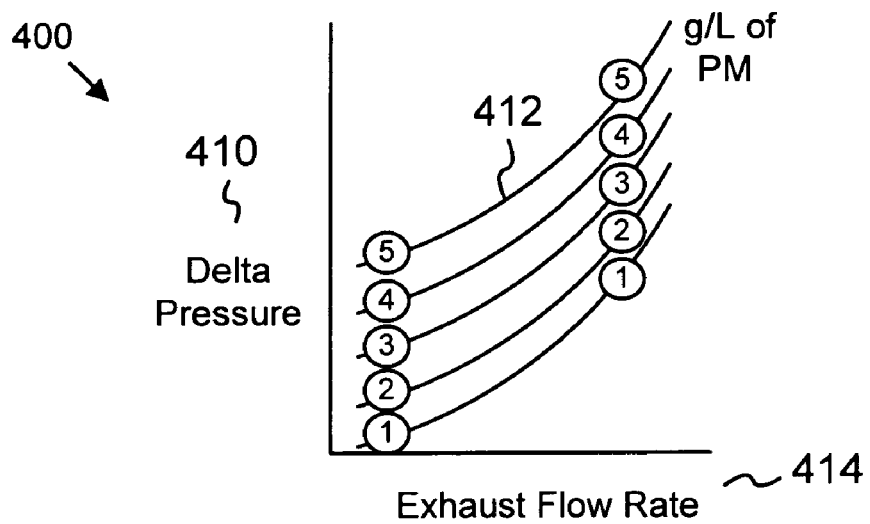
FIG. 4A is a graph illustrating one embodiment of multiple delta pressure measurements graphed relative to a changing volumetric flow rate of exhaust gas passing through a particulate filter with uniformly distributed soot loads.

FIG. 4A is a graph 400 illustrating a typical delta pressure measurement 410 curve 412 for a uniformly-distributed particulate filter 150 as a function of exhaust gas flow rate 414. The graph 400 depicts a delta pressure measurement curve 412 (1-5) for five different amounts of particulate accumulated on the filter 150 at an increasing flow rate 414. When the particulate matter is evenly distributed on the particulate filter 150, the delta pressure measurement 410 increases along a predicted curve 412 as the flow rate 414 increases. Consequently, the delta pressure measurement 410 may, under certain circumstances, accurately indicate the accumulated soot load at varying flow rates.

Figure 4B:
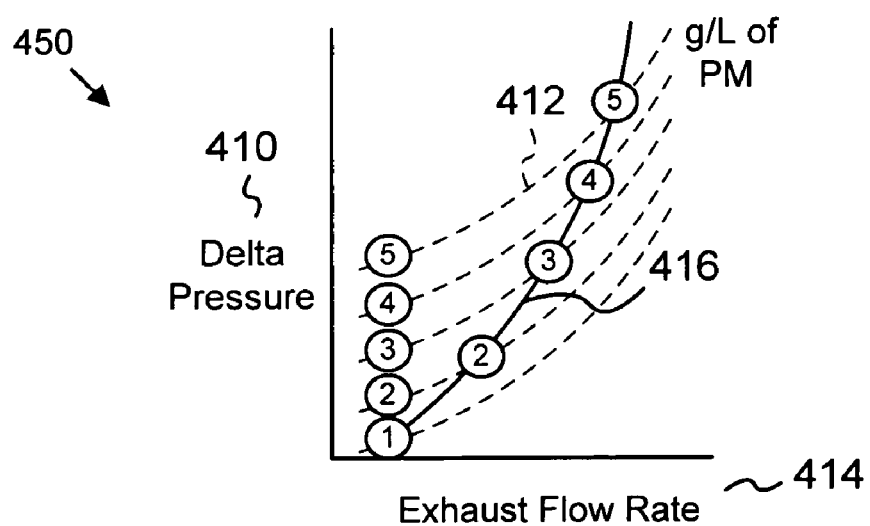
FIG. 4B is a graph illustrating one embodiment of a curve defining a delta pressure measurement relative to a volumetric flow rate of exhaust gas passing through a particulate filter with a mal-distributed soot load.

However, as mentioned, the delta pressure measurement 410 does not always accurately reflect the actual amount of soot accumulated on a particulate filter. FIG. 4B is a graph 450 illustrating an irregular delta pressure measurement 410 curve 416 for a mal-distributed particulate filter 150, which may be caused by a filter regeneration event or oxidation in certain embodiments. As the exhaust flow rate 414 increases, the delta pressure measurement 410 defines a curve 416 that indicates multiple soot or particulate load amounts (1-5). At lower flow rates, the delta pressure measurement 410 may indicate a lower soot estimate because the exhaust gas passes freely through the holes in the mal distributed particulate. At higher flow rates, the accumulated particulate may cause the back pressure to increase, indicating a greater particulate load. Because normal curves 412 may be referenced for determining a particulate or soot load estimate, the deviating delta pressure curve 416 inaccurately estimates the actual soot load amount.

In certain embodiments, the feedback module 220 compares the delta-pressure indicated particulate accumulation with flow rate over a short period of time. In one embodiment, the TFR module 224 tracks changes in apparent differential pressure-based soot loading during transient exhaust gas flow rates. If the indicated soot accumulation increases with changes in mass flow rate, then mal-distribution is indicated. The amount of change in the indicated soot accumulation with mass flow rate may be used to quantify the degree of mal-distribution. If operating conditions permit, and assuming the particulate accumulation remains relatively unchanged over a short period of time, the distribution of particulate matter on a particulate filter may be determined by comparing delta-pressure mass estimates for particulate accumulation at higher and lower flow rates, as illustrated by the following equation:

$$m_{b y \Delta P}(\text{at low flow rate})/m_{b y \Delta P}(\text{at high flow rate})=\text{distribution indicator} \quad \text{Equation 4}$$

where $m_{b y \Delta P}$=the particulate mass estimate determined by the differential pressure sensor at a given flow rate.

An evenly distributed particulate filter will indicate a ratio of about 1:1 or a distribution indicator of 1. The greater the difference in estimated values, the greater the indicated mal-distribution.

Another comparison involves dividing the change in the delta-pressure mass estimate by the change in the flow rate 414, as illustrated by the following equation:

$$\Delta m_{b y \Delta P}/\Delta \text{flow}=\text{distribution indicator} \quad \text{Equation 5}$$

where $\Delta m_{b y \Delta P}$=the difference between particulate mass estimate as determined by the differential pressure sensor; and $\Delta$flow=the difference in corresponding exhaust gas flow rates at the time the delta-pressure-based measurements are taken.

In one embodiment, if the indicated soot changes by more than 1 gram per liter with a doubling of the mass flow rate, then mal-distribution is indicated.

A short period of time for flow rate comparisons may signify a selected period of time to run the algorithm in which the system 100 does not deposit an appreciable amount of soot. In one embodiment, the time period is determined as 15 minutes in which the system could not have generated 0.25 grams per liter of particulate on the filter as if the delta pressure-based mass estimate indicates that mal distribution is probably present. In another embodiment, the duration of time may be extended by predicting the amount of soot that typically would be generated during the algorithm run time and then subtracting the determined amount of soot from the indicated change for mal-distribution purposes. For example, if the algorithm runs for thirty minutes and the sensor 260 indicates an increase of particulate of 1.0 grams per liter with a doubling in the mass flow rate, but the model module 240 indicates that 0.25 grams per liter were actually generated by the system during that time, then only 0.75 grams per liter would be attributed to the flow rate change.

Referring again to FIG. 2, the feedback module 220 may utilize the feedback information provided by the differential pressure sensor 260 and condition control 270 to determine a first distribution of particulate matter on the particulate filter 150. The TFR module 224 may be referenced for relatively short periods of time to compare delta-pressure mass estimates at transient flow rates, and the TSL module 222 may be referenced for longer periods of time to compare transient apparent soot loading estimates.

The feed forward module 230 is configured to determine a particulate distribution trend from supplemental data derived from known conditions. As the name implies, the feed forward module 230 may predict the particulate distribution trend before information from the feedback module 220 is available to directly verify the particulate distribution. This is especially important in a system, such as an exhaust gas after-treatment system 100, where the feedback data is only available intermittently and there is no way to force the conditions to produce a feedback-capable event. The feed forward module 230 may receive input from the condition control unit 270, the feedback module 220, the sensor input module 210, and/or additional sources for an account of recent conditions. Alternatively, or in addition, one or more models 240 may also be referenced for supplemental data to determine a particulate distribution trend.

Figure 9A:
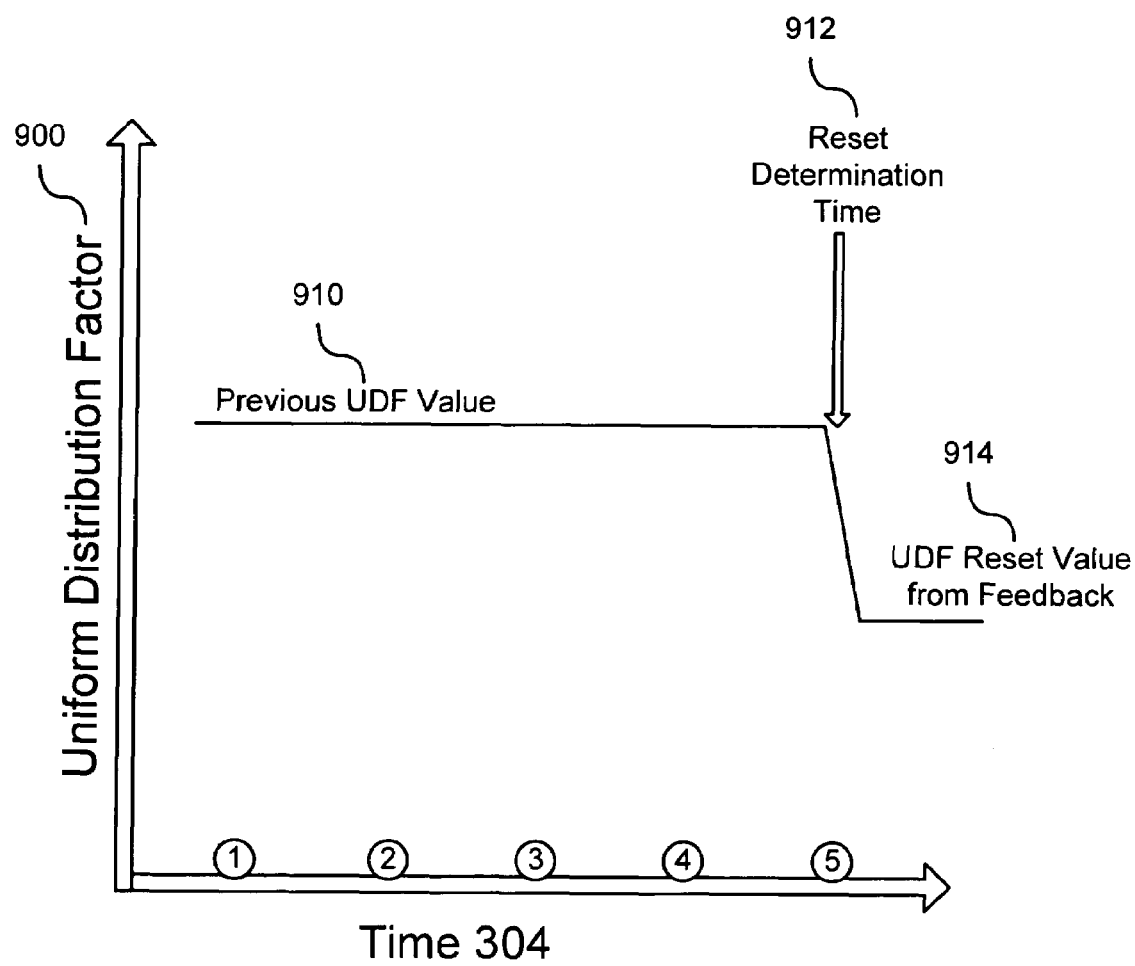
FIG. 9A is a graph illustrating one embodiment of a particular fluctuation of the uniform distribution factor related to a feedback event in accordance with the present invention.

In one embodiment, the feed forward module 230 trends the uniformity of particulate distribution on the filter 150 toward a nominal value with a certain time constant whenever the filter 150 is simply filling and not undergoing significant oxidation. In this situation, as the filter 150 accumulates particulate, the particulate distribution typically reflects a nominal amount of uniformity. If the filter particulate distribution is more uniform than nominal, for example a factory clean filter 150 without any soot accumulation, then the filter particulate distribution will trend toward the nominal value as the filter 150O fills with soot, as illustrated in FIG. 9E, further discussed below. If the filter particulate distribution is less uniform than nominal, for example a filter 150 with mal-distributed soot accumulation, then the incoming soot will preferentially fill holes in the soot since those holes will accept greater flow, and the filter will trend back toward nominal uniformity, as illustrated in FIG. 9F further discussed below.

In one embodiment of a diesel engine platform, the filter particulate distribution trends back toward nominal within about four hours of engine operation. A time constant, or the amount of time to decay to the nominal uniformity distribution level, can be determined for a given particulate filter 150 and system setup from operational experience.

In another embodiment, the particulate distribution on the filter trends back toward nominal at a variable rate proportional to the soot generation of the system. Soot generated at twenty grams/hour fills holes more rapidly than soot generated at five grams/hour, and thus, in the former case, the soot distribution returns to nominal uniformity more quickly. Determining a variable rate of soot generation may be beneficial in systems where soot generation prediction and/or measurement precision are enabled. Again, the relationship between soot generation and the rate of decay to nominal uniformity can be determined from operational experience with a given filter and system setup.

One or more model modules 240 may provide supplemental data to facilitate determining the distribution of particulate matter on a particulate filter 150, and/or the particulate distribution trend. In one embodiment, the model module 240 uses an estimate of particulates emitted from an operating engine 110. In an alternative embodiment, the model 240 estimates an oxidation rate to determine an amount of soot consumed and/or a soot accumulation rate. Modeled supplemental data may facilitate determining an accurate estimation of soot accumulated on the particulate filter and/or the distribution homogeny of the particulate matter. The model 240 may be configured to determine various measurements and/or calculations to determine or define a particular situation and/or event. The model 240, in certain embodiments, may calculate an expected response value from data input and may provide the expected response value to the feedback module 220 and/or the feed forward module 230.

In one embodiment, the model 240 may facilitate detecting and labeling a filter regeneration event. An apparatus, system, and method for detecting and labeling a filter regeneration event is disclosed in greater detail in related application entitled, "APPARATUS, SYSTEM, AND METHOD FOR DETECTING AND LABELING A FILTER REGENERATION EVENT," which is hereby incorporated by reference into this document. Determining when a filter regeneration event is occurring or has occurred may facilitate determining the distribution of particulate matter on a particulate filter 150. In certain embodiments, the feed forward module 230 may determine a particulate distribution trend from supplemental data indicating the occurrence of a filter regeneration event, which will be discussed in greater detail with relation to FIGS. 9B-9G.

The selection control module 250 selectively combines the first distribution of particulate matter determined by the feedback module 220 and the particulate distribution trend determined by the feed forward module 230 to determine a second distribution of particulate matter. In one embodiment, the selection control module 250 filters information provided by the feed forward module 230 to determine an adjustment to the first distribution estimate. Adjustments may be necessary when conditions or time indicate that the first distribution of particulate matter is no longer accurate, or when accurate feedback is no longer available.

Selectively combining input from multiple sources, including feedback and modeled input, enables the controller 205 to provide a continuous estimate and/or determined distribution of particulate matter accumulating on the filter 150. Selectively combining input may be particularly valuable during periods when the delta-pressure mass estimate is unreliable or unavailable, such as during periods of low exhaust gas flow rates, soot oxidation, and the like.

The selection control module 250 may favor the first distribution of particulate matter derived from sensor input during periods of high sensor reliability. However, during periods of low trust in the differential pressure sensor 260, the selection control module 250 may selectively combine feedback data and supplemental data as described supra, to determine a second particulate distribution, in order to provide an accurate estimation of actual filter conditions.

In one embodiment, the distribution of particulate matter on a particulate filter is defined as a value such as a uniform distribution factor. In another embodiment, the distribution of particulate matter is defined according to a category of uniformity, such as low, medium, nominal, or high uniformity. In yet another embodiment, a percentage may be determined to describe the distribution, such as 80% uniform or 60% uniform. Those skilled in the art will recognize that the distribution of particulate matter on the particulate filter may be defined using various methods and/or output values in light of this disclosure.

Figure 5:
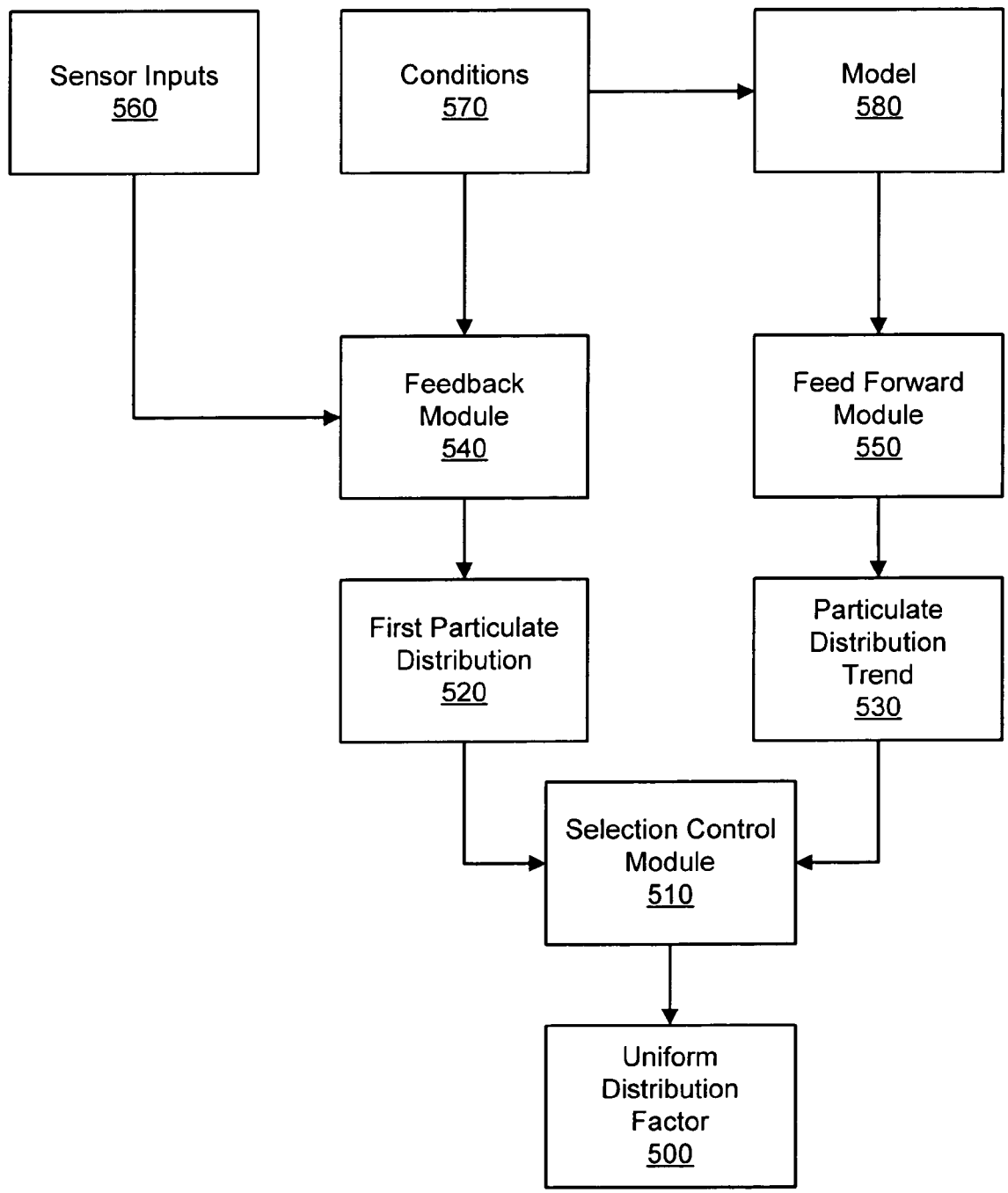
FIG. 5 is a schematic block diagram illustrating one embodiment of a process flow for determining a uniform distribution factor in accordance with the present invention.

FIG. 5 illustrates one embodiment of a manner of determining a uniform distribution factor 500 determined by a selection control module 510 such as the selection control module 250 of FIG. 2. In one embodiment, the uniform distribution factor 500 is used to facilitate the determination of an estimated accumulated particulate load and/or to determine a trust factor or predicted reliability, such as the reliability of a differential pressure sensor or sensor input. The uniform distribution factor 500 may further reflect soot consumption or oxidation occurring within the filter 150.

In the depicted embodiment, the selection control module 510 selectively combines a first particulate distribution 520 and a particulate distribution trend 530 to determine the uniform distribution factor 500. The particulate distribution trend 530 may indicate a rate of decay toward a nominal value in certain embodiments. A feedback module 540 receives feedback input from sensor inputs 560 and conditions 570 to determine the first particulate distribution 520 as discussed above. The first particulate distribution 520 may also be defined as a uniform distribution factor in certain embodiments. A feed forward module 550 receives modeled information from a model 580 that determines an expected response from conditions 570 in certain embodiments. The modeled information may determine a net rate of soot accumulation as described above.

The uniform distribution factor 500 may be adjusted according to engine operating conditions 570, sensor inputs 560, and model-based 580 information as feedback becomes available. In certain embodiments, a detected filter regeneration event may indicate a change in the accumulated soot that affects the distribution of particulate matter. Accordingly, the uniform distribution factor adjustment 500 may be adjusted to reflect the changed condition of the particulate or soot on the filter 150. The distribution factor 500 will be discussed in greater detail with relation to FIGS. 8-9G.

The selection control module 510 determines an estimated condition of the particulate matter on the particulate filter, which may function similar to a virtual sensor when direct measurements are unavailable. Various forms of supplemental data and feedback may be combined to create a descriptive indicator. The exhaust gas after-treatment system 100 may use the determined distribution data, or uniform distribution factor 500, to determine a predicted reliability, or a trust factor in certain embodiments, of the delta-pressure determined mass estimate.

Shifting trust away from the delta pressure sensor response during periods of low particulate distribution uniformity prevents the exhaust gas after-treatment system 100 from registering an incorrect soot load amount, as discussed in relation to FIG. 4B, for use in other algorithms. In certain embodiments, trust may be shifted away from the delta pressure sensor response in favor of an estimation or model-based response until conditions 570 indicate that the delta pressure response can be trusted to produce accurate input or accurate estimations of the accumulated particulate matter. A method for utilizing a trust factor is disclosed in greater detail in related application entitled, "APPARATUS, SYSTEM, AND METHOD FOR DETERMINING AND IMPLEMENTING ESTIMATE RELIABILITY," which is hereby incorporated by reference into this document.

Figure 6A:
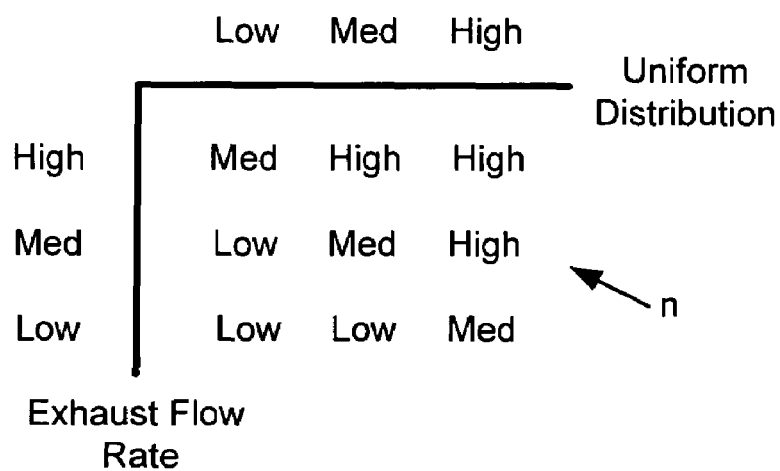
FIG. 6A is a chart illustrating one embodiment of a trust factor determiner based on defined conditions in accordance with the present invention.

FIG. 6A illustrates one embodiment of a trust factor n. When the volumetric flow rate of the exhaust gas and the uniform distribution of soot accumulation are high, the trust factor is high and the delta pressure sensor response is mainly used to determine the soot load estimate. When the volumetric flow rate and the uniform distribution are low, the trust factor is low and the model-based expected response is mainly used to estimate soot accumulation. When the trust factor is medium, the soot load estimate may be based on the delta pressure sensor response and a model-based expected response. The trust factor indicates a direction, or rate of decay to the absolute value of the delta pressure sensor estimate.

Figure 6B:
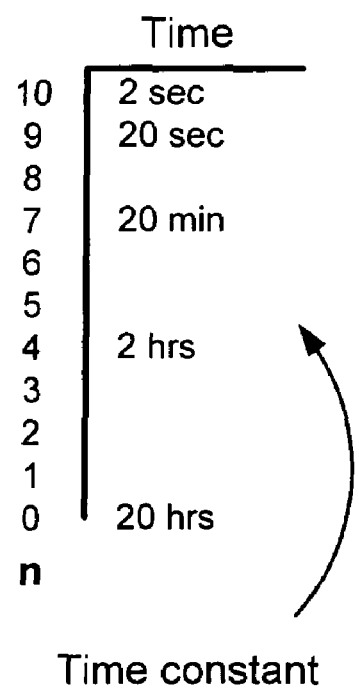
FIG. 6B is a chart illustrating one embodiment of a trust factor converted to a time constant in accordance with the present invention.

FIG. 6B illustrates one embodiment of a trust factor n converted to a time constant, which is a function of the trust factor n in certain embodiments. The time constant represents the time required for the delta-pressure-based soot load estimate to be constant at a certain level in order to trust the soot load estimate to represent the actual soot load in a particulate filter. A low level trust requires more time for the delta pressure sensor estimate to be trusted, while a high level trust requires less time to trust the delta pressure sensor estimate. The time constant may be exponential.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
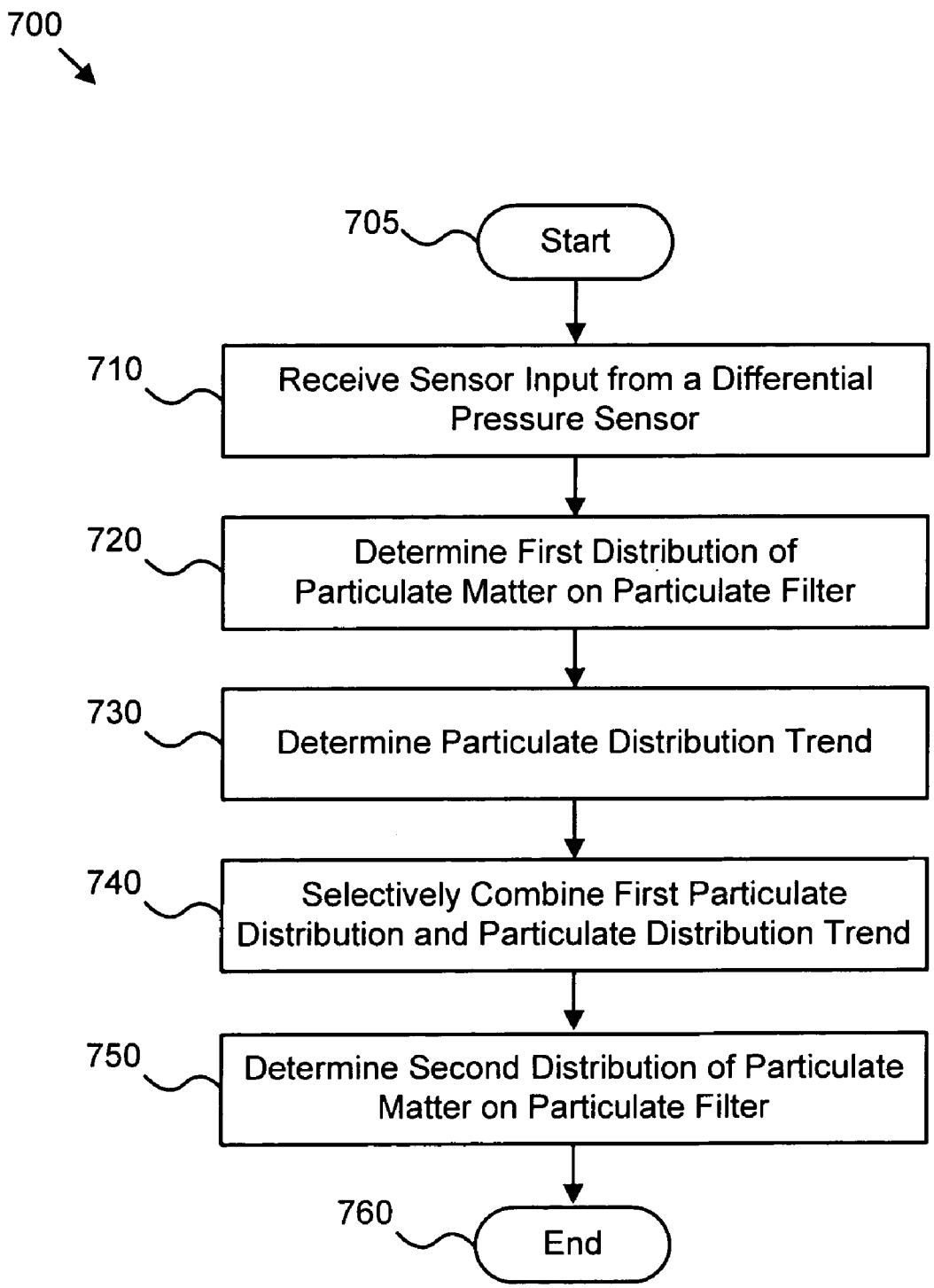
FIG. 7 is a schematic flow chart diagram illustrating one embodiment of a method of determining particulate distribution of the present invention.

FIG. 7 illustrates one embodiment of a particulate distribution determination method 700 for determining the distribution of particulate matter on a particulate filter. In certain embodiments, the determination method 700 may be accomplished in additional or fewer steps that those illustrated. To further illustrate the particulate distribution determination method 700, reference is made to FIGS. 1-5. The method 700 as depicted includes starting 705 and receiving 710 sensor input from a differential pressure sensor 160, determining 720 a first distribution of particulate matter on the particulate filter 150, determining 730 a particulate distribution trend, selectively combining 740 the first particulate distribution and the particulate distribution trend, and determining 750 a second distribution of particulate matter on a particulate filter 150. The method ends 760.

In one embodiment, the sensor input module 210 receives 710 sensor input from the differential pressure sensor 260. The sensor input module 210 may calculate an estimate of particulate matter accumulated on the particulate filter 150 from the sensor input. Alternatively or in addition, the sensor input module 210 may calculate the particulate accumulation rate 308 or other value derived from the sensor input, which may subsequently be used to determine additional feedback data. The feedback module 220 may determine 720 a first distribution of particulate matter from sensor input and conditional data, such as engine timing, engine speed rate, fuel rate, temperature, exhaust gas flow rate, and the like. In one embodiment, the feedback module 220 tracks changes in apparent differential pressure-based soot loading over time and changes in apparent differential pressure-based soot loading during transient exhaust gas flow rates to determine the distribution of particulate matter, as discussed above with reference to FIGS. 2-4C. In certain embodiments, a model-based soot accumulation rate compared to a sensor-based soot accumulation rate may facilitate determining 720 the first distribution of particulate matter on the particulate filter 150.

The feed forward module 230 may determine 730 the particulate distribution trend from supplemental data as further discussed below. In one embodiment, the feed forward module 230 determines a trend toward a nominal uniformity distribution level, which may be a time constant that decays toward a determined value in certain embodiments. Alternatively or in addition, from supplemental data, such as an oxidation determination model which may comprise the model module 240, the feed forward module 230 may determine a trend toward a reset value or an adjustment to adjust the first distribution in order to more accurately reflect known conditions.

The selection control module 250 may selectively combine 740 the first particulate distribution and the particulate distribution trend to determine 750 a second distribution of particulate matter. The second distribution may more accurately estimate a filter particulate distribution, particularly when reliable feedback, such as sensor input, is not available for a period of time. In certain embodiments, the first distribution and/or the second distribution may be defined as the uniform distribution factor 500, which may be used in a further algorithm to determine the reliability of the differential pressure sensor 160 and/or sensor input.

Figure 8:
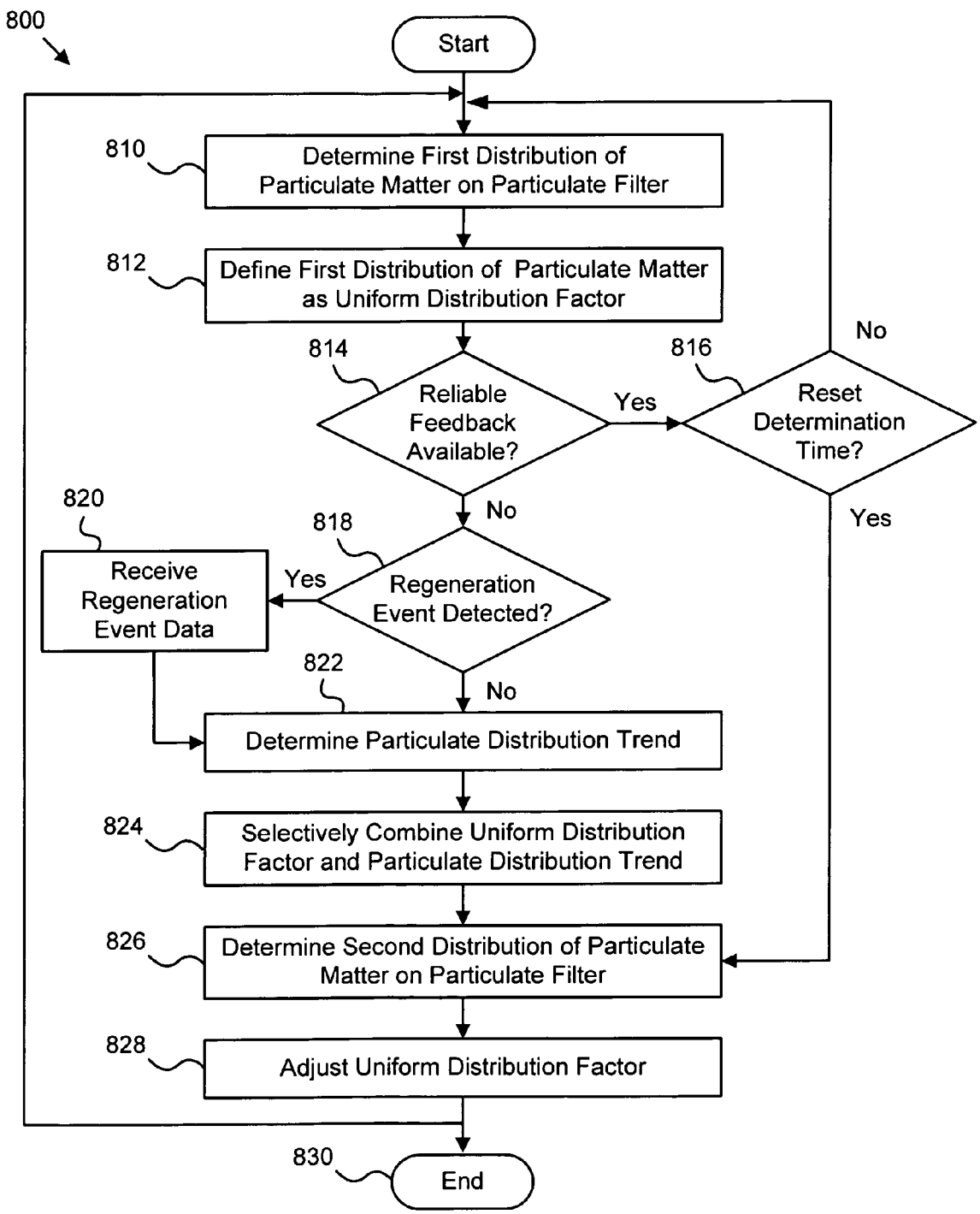
FIG. 8 is a schematic flow chart diagram illustrating one embodiment of a method of determining a uniform distribution factor in accordance with the present invention.

FIG. 8 illustrates one embodiment of a uniform distribution factor determination method 800 in accordance with the present invention. The uniform distribution factor determination method 800 includes starting 805 and determining 810 a first distribution of particulate matter on the particulate filter 150, defining 812 the first distribution of particulate matter as a uniform distribution factor, determining 814 whether reliable sensor feedback is available, determining 816 a reset determination time, determining 818 whether a filter regeneration event is detected, receiving 820 regeneration event data, determining 822 a particulate distribution trend, selectively combining 824 the uniform distribution factor and the particulate distribution trend, determining 826 a second distribution of particulate matter on the particulate filter 150, and adjusting the uniform distribution factor 828. The uniform distribution factor determination method 800 may loop, in certain embodiments, to determine 810 a first distribution of particulate matter near the end of the method 800 as reliable feedback becomes available, or the uniform distribution factor determination method 800 may end 830.

The uniform distribution factor determination method 800 will be discussed in greater detail with relation to FIGS. 9A-9G. FIG. 9A illustrates one embodiment of a uniform distribution factor 900 relative to time and adjusted according to determined feedback. A first distribution is determined 810 (FIG. 8) by the feedback module 220 and defined 812 as a uniform distribution factor 910 according to one embodiment.

Subsequently, the feedback module 220 may track changes in apparent differential pressure based soot loading (1-5) over time 304 and/or changes in differential pressure-based soot loading during transient exhaust gas flow rates or the like. If reliable feedback 814 is available, and a reset determination time 912 is reached 816, then a second distribution of particulate matter on the particulate filter 150 may be determined 826 and the uniform distribution factor 910 may be adjusted 828 accordingly. In one embodiment, the determined adjustment may be a reset value 914 or a determined value relative to tracked changes.

The reset value 914 may be determined by several different methods as discussed above with relation to FIGS. 2-4C. In certain embodiments, the reset value 914 is adjusted according to a determined degree of filter particulate mal-distribution. In one embodiment, the soot loading indicated at point (1) is compared to the indicated soot loading at point (5). In another embodiment, the slope of the accumulation rate from point (1) to point (5) is compared with an accumulation rate indicated by a model-based estimation or a maximum particulate output value or accumulation rate. Those of skill in the art will recognize that a second distribution determination 826 and a uniform distribution factor adjustment 828 may be accomplished through a variety of methods.

Figure 9B:
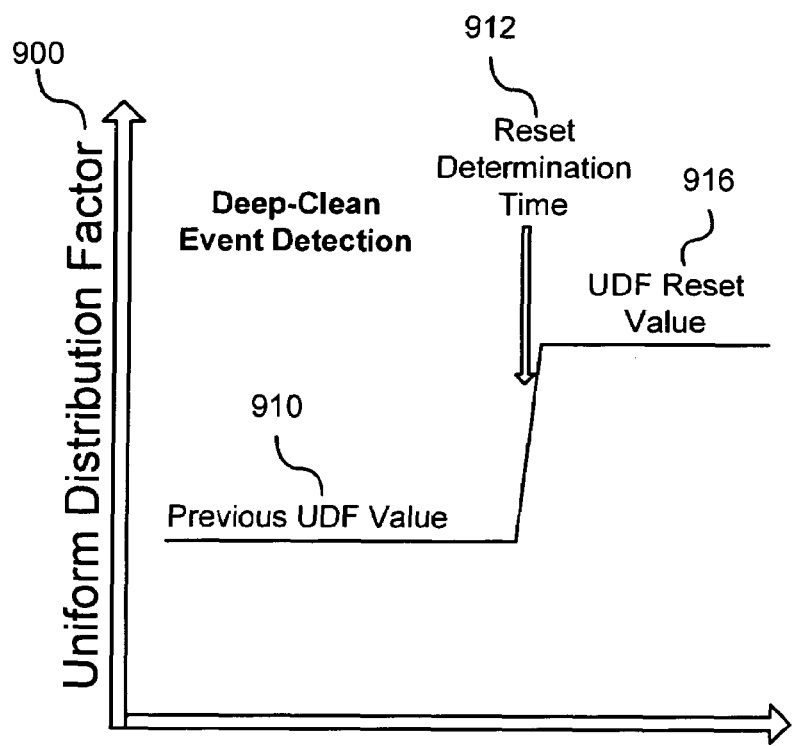
FIGS. 9B-9D are graphs illustrating embodiments of particular fluctuations of the uniform distribution factor related to event detection in accordance with the present invention.
Figure 9C:
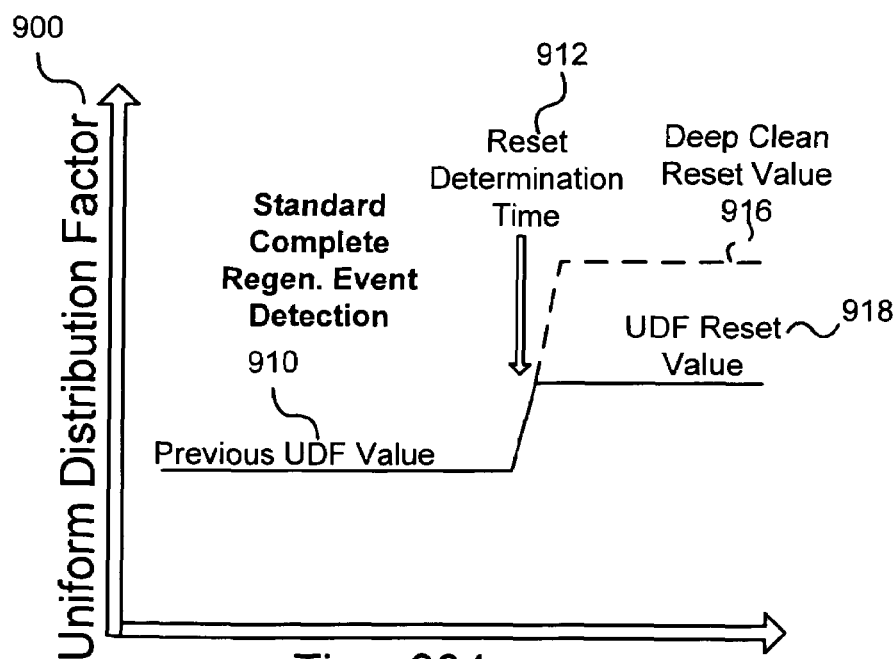

FIGS. 9B-9C illustrate a plurality of reset values determined by a detected filter regeneration event according to one embodiment. A regeneration event typically affects the distribution of particulate matter on a particulate filter 150 and may alter the particulate distribution after a first particulate distribution is determined 810. In one embodiment, a regeneration event is detected 818 and labeled. In certain embodiments, a regeneration event may be identified as: a deep clean regeneration event, a complete regeneration event, a partial regeneration event, and an ineffective regeneration event. An ineffective regeneration event may be calculated as a partial regeneration event in certain embodiments.

The feed forward module 230 may receive 820 supplemental data for the detected regeneration event and may subsequently determine 822 a particulate distribution trend relative to the type of filter regeneration event. The particulate distribution trend, in certain embodiments, may indicate an adjustment in the uniform distribution factor 910 and/or the first distribution of particulate matter. In one embodiment, the adjustments may be: a predetermined step increment of a determined value, a rate of change with time of a determined value, a calculated increment of a determined value, and/or a reset value. The particulate distribution trend may indicate one or more of the identified adjustments, or a combination of the adjustments.

FIG. 9B illustrates one embodiment of a uniform distribution factor reset value 916 determined for a deep-clean regeneration event. A deep-clean regeneration event may be equivalent to a factory clean particulate filter 150 in certain embodiments. Accordingly, a reset value 916 may be determined to indicate a high uniform distribution factor 900 value.

FIG. 9C illustrates one embodiment of a uniform distribution reset value 918 determined for a complete regeneration event. A complete regeneration event may indicate a relatively uniform distribution, but with some soot remaining on the filter 150. In certain embodiments, a certain amount of accumulated soot may be allowable for a desired filter condition. Consequently, a complete regeneration event reset value 918 may indicate a high level of particulate uniformity, but lower than a reset value 916 for a deep clean regeneration event. The selection control module 250 may selectively combine 824 the previously determined uniform distribution value 910 and the particulate distribution trend to determine 826 a second distribution of particulate matter, and may adjust 828 the uniform distribution factor 910 to the corresponding predetermined reset value 916, 918 relative to the determined 826 second distribution.

Figure 9D:
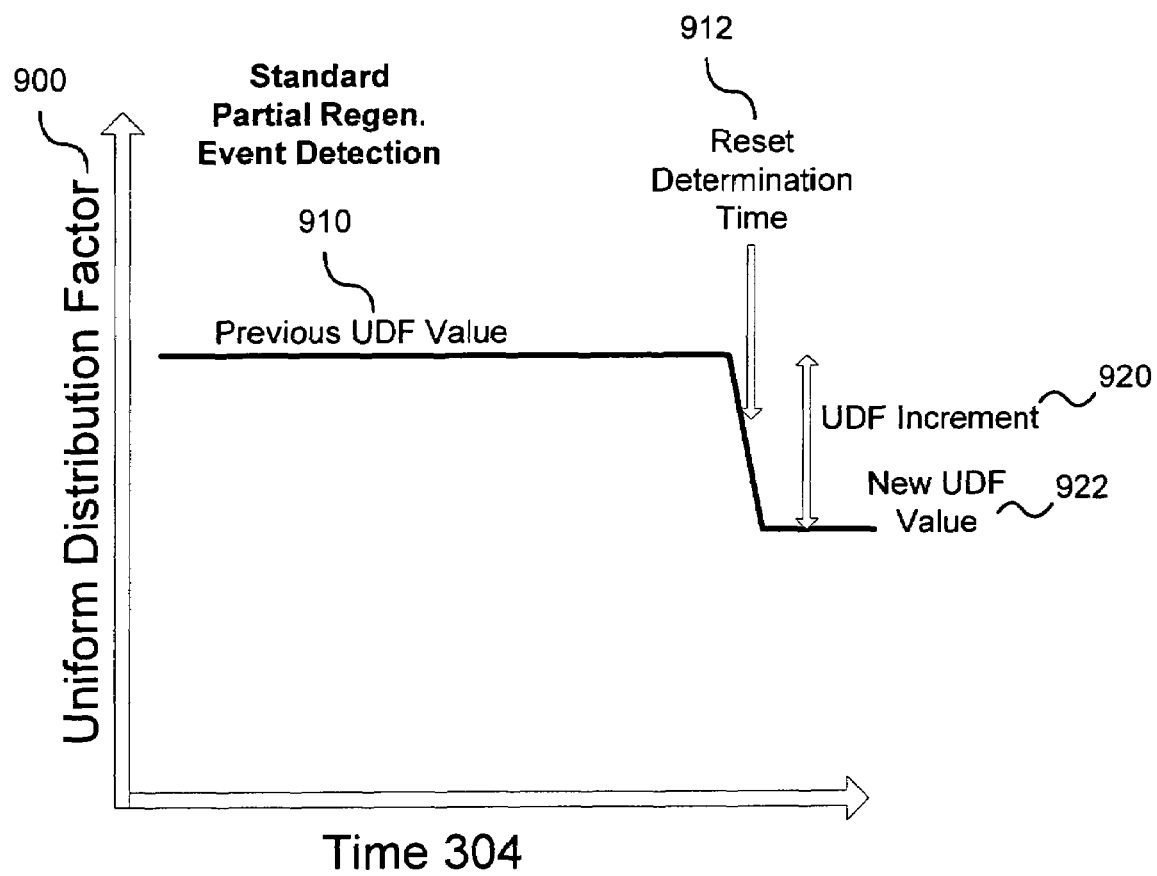
Figure 9E:
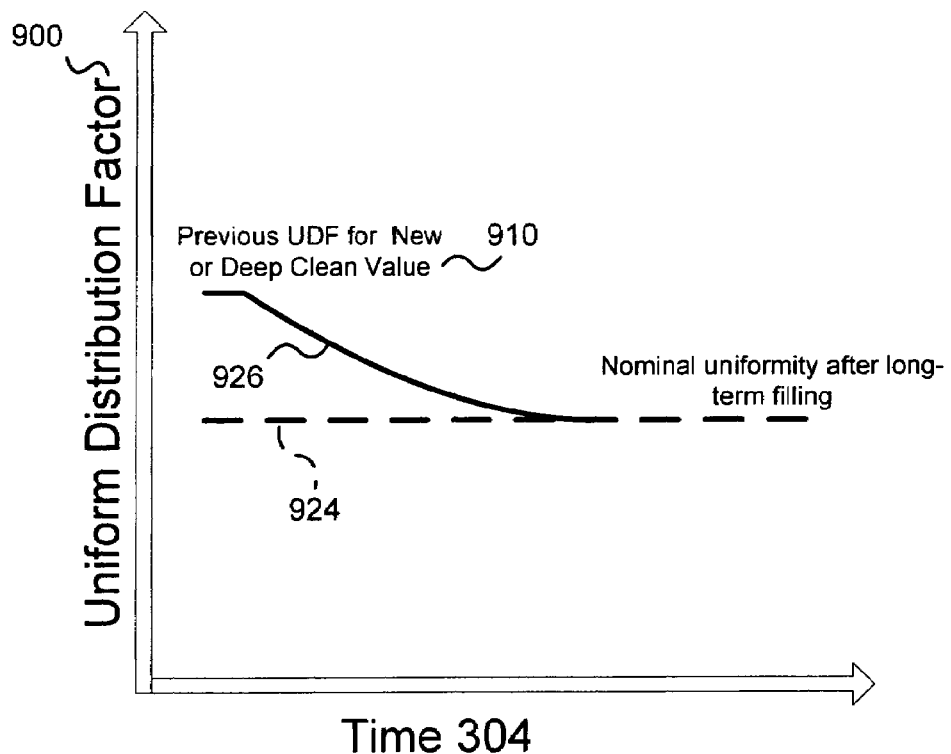
FIGS. 9E-9F are graphs illustrating embodiments of particular fluctuations of the uniform distribution factor related to particulate distribution trends over time in accordance with the present invention.
Figure 9F:
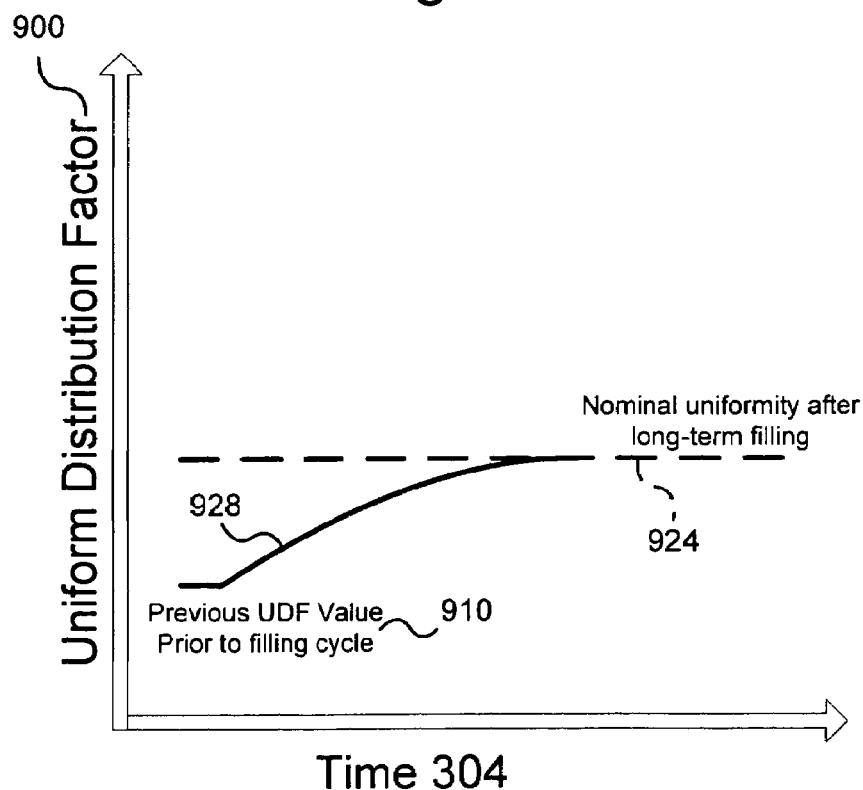

FIG. 9D illustrates one embodiment of a value increment 920 indicated for a detected partial regeneration event. A particulate distribution trend for a partial regeneration event may indicate a value adjustment 922 for the uniform distribution factor 910. In certain embodiments, the value increment 920 may be a predetermined step increment (or decrement) indicated for a partial regeneration event detection (e.g., New UDF Value 922=UDF Value 910−0.1). Alternatively, the step increment 920 may be a percentage of the uniform distribution factor value 910 (e.g., New UDF Value 922=UDF Value 910−10%*UDF Value 910). Alternatively, the value increment 920 may be a calculated increment or percentage determined for an amount of change on the filter 150. In one embodiment, the increment value 920 is a percent decrement corresponding to the amount of soot oxidized during a partial regeneration event as illustrated in Table 1.

TABLE 1

Example Increment Calibration (15 L Engine)
Percent (%) Decrement to Uniform Distribution Factor

| Start Load | End Load (g) | | | | | | | |
|---|---|---|---|---|---|---|---|---|
| (g) | 90 | 80 | 70 | 60 | 50 | 40 | 30 | 20 |
| 100 | 5 | 10 | 20 | 25 | 20 | 15 | 5 | 0 |
| 90 | 0 | 5 | 10 | 20 | 20 | 15 | 5 | 0 |
| 80 | 0 | 0 | 5 | 10 | 20 | 15 | 5 | 0 |
| 70 | 0 | 0 | 0 | 5 | 10 | 15 | 5 | 0 |
| 60 | 0 | 0 | 0 | 0 | 5 | 15 | 5 | 0 |
| 50 | 0 | 0 | 0 | 0 | 0 | 5 | 5 | 0 |
| 40 | 0 | 0 | 0 | 0 | 0 | 0 | 5 | 0 |

According to the illustrated embodiment, if the amount of soot remaining on the particulate filter 150 decreases significantly, the uniform distribution factor 910 remains relatively unchanged, signifying a similar level of particulate distribution. If about half or less of the soot on the filter 150 is oxidized, the increment value 920, or the percent decrement indicated, is relatively greater, thereby indicating an increase in particulate mal-distribution, or in other words, less particulate uniformity across the filter 150. The selection control module 250 may determine 826 a second distribution of particulate matter by selectively combining 824 the uniform distribution factor 910 and the particulate distribution trend, and may adjust 828 the uniform distribution factor 910 accordingly.

FIGS. 9E and 9F illustrate one embodiment of a particulate distribution trend for periods of time when no filter regeneration event is detected 818, or extended periods of soot accumulation, as discussed above. The feed forward module 230 may determine 822 a particulate distribution trend toward a nominal uniformly distributed level 924, which may indicate a uniform distribution factor 910 adjustment relative to a rate of change with time. If the uniform distribution factor value 910 is greater than the nominal uniformly distributed level 924, the trend indicates a value decay down 926 toward the nominal uniformly distributed level 924. If the uniform distribution factor value 910 is less than the nominal uniformly distributed level 924 (See FIG. 9F), the trend indicates a value decay up 928 toward the nominal uniformly distributed level 924.

The selection control module 250 selectively combines 824 the uniform distribution factor 910 and the particulate distribution trend(s) as indicated and determines 826 a second distribution of particulate matter on a particulate filter 150. In other words, the selection control module 250 determines whether one or more particulate distribution trend is indicative of a particulate distribution different than the first particulate distribution determined by reliable feedback. The determination 826 may be made during a timed cycle, or following a determined period of time in certain embodiments. If the particulate distribution trend(s) indicate a change in particulate distribution, the uniform distribution factor 910 may be adjusted 828 accordingly.

Figure 9G:
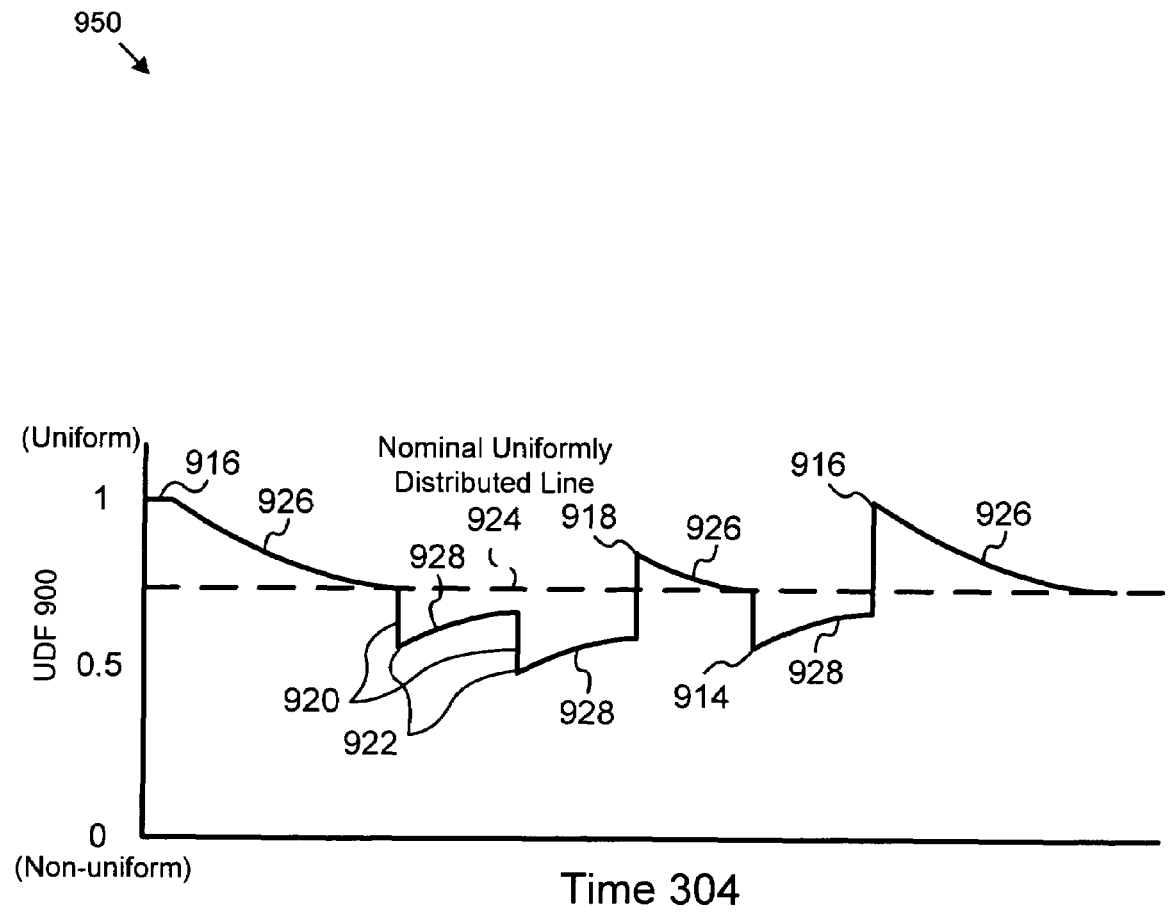
FIG. 9G is a graph illustrating one embodiment of a uniform distribution factor fluctuating over time as the distribution of particulate matter on a particulate filter changes during periods of engine operation and filter regeneration event detection, in accordance with the present invention.

FIG. 9G illustrates one embodiment of a graph 950 depicting a uniform distribution factor 900 fluctuating over time as the distribution of particulate matter on a particulate filter changes during periods of engine operation. Multiple uniform distribution factor adjustments discussed with relation to FIGS. 9A-9F are further illustrated on the graph 950.

In the depicted embodiment, the uniform distribution factor 900 is a value y, wherein $0 \leq y \leq 1$. The particulate distribution varies between uniform distribution (1) and varying degrees of non-uniform distribution. A uniform distribution factor 900 with a value of one (1) represents a homogenous, even distribution of particulate matter on a particulate filter 150, or substantially no accumulated soot. A uniform distribution factor 900 with a value less than one signifies a variation in the distribution of particulate matter on the particulate filter 150. A uniform distribution factor 900 with a value near zero implies substantial differences between areas of accumulated particulate matter and areas of little or no particulate accumulation.

A value decrement 920 on the graph 950 implies that particulate matter is becoming non-uniform on the filter 150, typically due to soot oxidation or noxidation burning holes through the soot layer. As mentioned previously, the distribution factor 900 may reflect a trend toward nominal uniformity as indicated by the nominal uniformly distributed line 924. The selection control module 250 may determine multiple adjustments from feedback and supplemental data and may adjust 828 the uniform distribution factor 900 as illustrated.

In the depicted graph 925, time 304 commences with a newly installed filter 150, or a deep clean regeneration event reset value 916 according to one embodiment, with substantially no particulate accumulation. As particulate matter begins to accumulate, the particulate distribution trends down 926 to the nominal uniformity distribution level 924 until a regeneration event is detected. In the illustrated embodiment, a partial regeneration event occurs and the uniform distribution factor 900 is decremented a step increment value 920 to a new uniform distribution factor value 922. The uniform distribution factor decrement 920 may be determined according to supplemental data received 820 for a particular regeneration event or the like.

During periods of soot accumulation, the distribution decays 928 toward the nominal uniformity distribution line 924 until another partial regeneration event is detected, further decreasing the uniform distribution value 922. Subsequently, a complete regeneration event is detected and the uniform distribution factor 900 is reset to a corresponding preset value 918. The distribution factor then decays 926 toward nominal uniformity 924 until reliable feedback from a differential pressure sensor 160 is determined and a feedback value 914 adjustment is made. Once again, the uniform distribution factor 900 decays toward 928 nominal uniformity 924 until a detected deep clean regeneration event resets the uniform distribution factor 900 to a preset value 916, restarting the adjustment process in certain instances.

Determining the uniformity of the distribution of particulate matter on a particulate filter facilitates estimating the true condition of particulate matter on a particulate filter 150. As a result, sensor input from the differential pressure sensor, in certain embodiments, may be weighted according to a known or estimated condition of the particulate filter. For example, if a partial regeneration event has recently occurred, the exhaust gas after-treatment system 100 may recognize that although the delta-pressure sensor 160 estimates a low mass estimate for the particulate accumulation, the exhaust gas after-treatment system 100 may assume that the distribution of the particulate matter on the filter 150 is non-uniform, and thus the accumulated particulate matter is actually greater than the amount estimated by the delta-pressure sensor 160. As exhaust gas passes through the particulate filter, the particulate distribution tends to becomes more uniform and the delta-pressure sensor 160 consequently becomes more reliable as a source for accurate feedback.

The present invention may be embodied in other specific forms without departing from its spirit essential characteristics. The described embodiments are to be considered in all respect only as illustrative and not restrictive. The scope of the invention is, therefor, indicated by the appended claims rather than by the foregoing description. All changes which come with the meaning and range of equivalency of the claims are to be embraced within their scope.

What is claimed is:

1. An apparatus to evaluate the distribution uniformity of particulate matter across a filter configured to capture the particulate matter present in exhaust gas produced from operation of an internal combustion engine, the apparatus comprising:
   an input module, the input module configured to receive input from a differential pressure sensor, the differential pressure sensor configured to determine the pressure change of exhaust gas upstream and downstream from the filter;
   a feedback module configured to determine a first rate of particulate matter accumulation on the filter based on a plurality of pressure change determinations taken over time; and
   a feedforward module configured to estimate a second rate of particulate matter accumulation on the filter based on a feedforward model;
   wherein the feedback module is configured to determine a first distribution uniformity of particulate matter across the filter based on a comparison between the first rate of particulate matter accumulation and the second rate of particulate matter accumulation.

2. The apparatus of claim 1, wherein the second rate of particulate matter accumulation represents a maximum possible rate of particulate matter accumulation, and wherein the first distribution uniformity represents a mal-distribution of particulate matter across the filter if the first rate of particulate matter accumulation is higher than the maximum possible rate of particulate matter accumulation.

3. The apparatus of claim 1, wherein the comparison between the first rate of particulate matter accumulation and the second rate of particulate matter accumulation comprises a division of the first rate of particulate matter accumulation by the second rate of particulate matter accumulation.

4. The apparatus of claim 1, wherein the feedback module is further configured to classify the first distribution uniformity of particulate matter as one of uniform and non-uniform.

5. The apparatus of claim 1, wherein the feedback module is further configured to define the first distribution uniformity of particulate matter as a uniform distribution factor.

6. The apparatus of claim 1, further comprising a feed forward module, the feed forward module configured to determine a particulate distribution uniformity trend from supplemental data derived from known conditions.

7. The apparatus of claim 6, further comprising a selection control module, the selection control module configured to selectively combine the first distribution uniformity of particulate matter and the particulate distribution uniformity trend to determine a second distribution uniformity of particulate matter across the filter.

8. The apparatus of claim 7, wherein the selection control module is further configured to classify the second distribution uniformity of particulate matter as one of uniform and non-uniform.

9. The apparatus of claim 7, wherein the selection control module is further configured to define the second distribution uniformity of particulate matter as a uniform distribution factor.

10. An apparatus to evaluate the distribution of particulate matter on a filter configured to capture the particulate matter present in exhaust gas produced from operation of an internal combustion engine, the apparatus comprising:
    an input module, the input module configured to receive input corresponding to engine operating conditions and input from a differential pressure sensor, the differential pressure sensor configured to determine the pressure change of exhaust gas upstream and downstream from the filter;
    a feedback module, the feedback module configured to compare the pressure change with a change in the engine operating conditions to determine a first distribution of particulate matter on the filter;
    a feed forward module, the feed forward module configured to determine a particulate distribution trend from supplemental data derived from known conditions; and
    a selection control module, the selection control module configured to selectively combine the first distribution of particulate matter and the particulate distribution trend to determine a second distribution of particulate matter on the filter;
    wherein the selection control module is further configured to define the second distribution of particulate matter as a uniform distribution factor, and
    wherein the particulate distribution trend is indicative of a uniform distribution factor adjustment, wherein the adjustment is at least one of the group including: a pre-determined step increment of a determined value, a rate of change with time of a determined value, a calculated increment of a determined value, and a reset value.

11. The apparatus of claim 1, wherein the feedback module further comprises a transient exhaust gas flow rate module, the transient exhaust gas flow rate module configured to track changes in apparent differential pressure-based particulate loading during transient exhaust gas flow rates.

12. The apparatus of claim 1, wherein the feedback module further comprises a transient apparent particulate loading module, the transient apparent particulate loading module configured to track changes in apparent differential pressure-based particulate loading.

13. The apparatus of claim 6, wherein the supplemental data comprises a detected regeneration related event.

14. The apparatus of claim 13, wherein the detected regeneration related event is at least one of the group including: a partial regeneration event, a complete regeneration event, a deep clean regeneration event, and an ineffective regeneration event.

15. A signal bearing medium tangibly embodying a program of machine-readable instructions executable by a digital processing apparatus to perform operations to evaluate the extent of mal-distribution of particulate matter across a filter configured to capture particulate matter present in exhaust gas produced from an internal combustion engine, the operations comprising:
    determining a plurality of particulate matter accumulation estimates each based on a pressure change of exhaust gas upstream and downstream from the filter;
    screening the plurality of particulate matter accumulation estimates according to a verification process;
    determining a rate of particulate matter accumulation on the filter based on particulate matter accumulation estimates that pass the verification process, wherein the rate of particulate matter accumulation determination is not based on particulate matter accumulation estimates that fail the verification process; and
    determining a first estimate of mal-distribution of particulate matter across the filter based on the determined rate of particulate matter accumulation on the filter.

16. The signal bearing medium of claim 15, wherein the operations further comprise determining a particulate mal-distribution trend from supplemental data derived from known conditions.

17. The signal bearing medium of claim 15, wherein the operations further comprise selectively combining the first estimate of mal-distribution of particulate matter and the particulate mal-distribution trend to determine a second estimate of mal-distribution of particulate matter.

18. A method for evaluating the uniformity of particulate matter across a filter configured to capture particulate matter present in exhaust gas produced from operation of an internal combustion engine, the method comprising:
    predicting a first estimate of the distribution uniformity of particulate matter across a filter using a feedforward method;
    determining a second estimate of the distribution uniformity of particulate matter across the filter using a feedback method, the feedback method comprising comparing a sensed pressure change of exhaust gas upstream and downstream from the filter with a change in at least one engine operating condition of the internal combustion engine; and
    determining a final distribution uniformity based on a weighted combination of the first and second estimates of the distribution uniformity, wherein the combination of the first and second estimates of the distribution uniformity is weighted based on a predicted reliability of the accuracy of the sensed pressure change.

19. The method of claim 18, wherein predicting the first estimate of the distribution uniformity of particulate matter across the filter comprises trending an estimation of the uniformity of particulate distribution across the filter toward a nominal value based on a calculated time constant, wherein the nominal value represents the predicted uniformity of particulate distribution across the filter after a predetermined period of time.

20. The method of claim 18, wherein the predicted reliability of the accuracy of the sensed pressure change is based on at least one of an exhaust gas flow rate and an oxidation event on the filter.

21. The method of claim 18, wherein determining the second estimate of the uniformity of particulate matter further comprises tracking changes in apparent differential pressure-based particulate loading during transient exhaust gas flow rates.

22. The method of claim 18, wherein determining the second estimate of the uniformity of particulate matter further comprises tracking changes in apparent differential pressure-based particulate loading.

23. The method of claim 18, further comprising defining the second estimate of the uniformity of particulate matter as a uniformity factor.

24. The method of claim 23, further comprising adjusting the uniformity factor.

25. The method of claim 19, wherein trending an estimation of the uniformity of particulate distribution across the filter comprises receiving supplemental data for a detected regeneration related event.

26. An exhaust gas after-treatment system for evaluating the uniformity of distribution of particulate matter, the system comprising:
an internal combustion engine generating exhaust gas;
sensors configured to determine engine operating conditions;
a filter, the filter configured to capture particulate matter present in the exhaust gas produced as a byproduct of engine operation;
a differential pressure sensor, the differential pressure sensor configured to determine the pressure change of exhaust gas upstream and downstream from the filter; and
a controller, the controller configured to estimate particulate matter accumulations on the filter based on determined pressure changes, the controller being configured to compare the particulate matter accumulation estimates with flow rates of the exhaust gas over a predetermined period of time to determine a first estimate of the distribution uniformity of particulate matter across the filter, wherein the predetermined period of time corresponds with a selected period of time during which the amount of particulate matter accumulating on the particulate filter remains relatively unchanged.

27. The system of claim 26, wherein comparing particulate matter accumulation estimates with flow rates of the exhaust gas comprises dividing a particulate matter accumulation estimate at a low exhaust flow rate by a particulate matter accumulation estimate at a high flow rate.

28. The system of claim 26, wherein comparing particulate matter accumulation estimates with flow rates of the exhaust gas comprises dividing a change in particulate matter accumulation estimates by a change in exhaust gas flow.

* * * * *